(12) United States Patent
Yamamoto et al.

(10) Patent No.: US 8,552,977 B2
(45) Date of Patent: Oct. 8, 2013

(54) INPUT APPARATUS, CONTROL APPARATUS, CONTROL SYSTEM, HANDHELD APPARATUS, AND CONTROL METHOD

(75) Inventors: Kazuyuki Yamamoto, Kanagawa (JP); Kenji Hachisu, Tokyo (JP)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 12/525,981

(22) PCT Filed: Dec. 1, 2008

(86) PCT No.: PCT/JP2008/071830
§ 371 (c)(1),
(2), (4) Date: Nov. 9, 2010

(87) PCT Pub. No.: WO2009/072475
PCT Pub. Date: Jun. 11, 2009

(65) Prior Publication Data
US 2011/0199289 A1     Aug. 18, 2011

(30) Foreign Application Priority Data
Dec. 7, 2007   (JP) .................................. 2007-317324

(51) Int. Cl.
*G06F 3/033*     (2013.01)
(52) U.S. Cl.
USPC ........................................................ 345/157
(58) Field of Classification Search
USPC .......................... 345/157–163, 167, 169, 184; 348/211.7, 734; 463/32, 37, 38; 725/39
See application file for complete search history.

(56) References Cited

U.S. PATENT DOCUMENTS

| 5,912,659 A | 6/1999 | Rutledge et al. |
| 7,030,856 B2 * | 4/2006 | Dawson et al. ............... 345/158 |

FOREIGN PATENT DOCUMENTS

| EP | 1804154 A2 | 7/2007 |
| JP | 2001-056743 | 2/2001 |
| JP | 3264291 | 3/2002 |
| JP | 2003-067136 | 3/2003 |
| JP | 2005-010994 | 1/2005 |
| JP | 2005-063228 | 3/2005 |

OTHER PUBLICATIONS

International Search Report dated Mar. 10, 2009, for corresponding Patent Application PCT/JP2008/071830.
European Search Report issued Feb. 13, 2012, for corresponding European Appln. No. 08857900.8.

* cited by examiner

*Primary Examiner* — Abbas Abdulselam
(74) *Attorney, Agent, or Firm* — K&L Gates LLP

(57) ABSTRACT

An input apparatus, a control apparatus, and the like with which an image displayed on a screen can be prevented from being moved unintentionally in a case where a user operates an operation section provided to the input apparatus are provided.
An MPU stores a displacement corresponding amount (velocity value) in a memory. When a switch of a button is turned on, the switch starts generating an operation signal and outputs the operation signal to the MPU. When the input of the operation signal from the switch is started, the MPU reads out the displacement corresponding amount stored in the memory, calculates a first correction displacement amount, and outputs it. Since the first correction displacement amount can be used to correct coordinate values of a pointer obtained before the switch is turned on after a start of a press of the button by the user, the pointer can be prevented from being moved unintentionally.

18 Claims, 22 Drawing Sheets

Unintentional movement of pointer before switch of button 11 is turned on (A)

Correction of unintentional movement of pointer (for example, n = 5)

(B)

History of displacement corresponding amount $V_{yi}$ stored in memory (A)

(B)

History of change rate $a_i$ of displacement corresponding amount stored in memory

INPUT APPARATUS, CONTROL APPARATUS, CONTROL SYSTEM, HANDHELD APPARATUS, AND CONTROL METHOD

CROSS REFERENCE TO RELATED APPLICATIONS

The present application is a National Stage of International Application No. PCT/JP2008/71830 filed on Dec. 1, 2008 and which claims priority to Japanese Patent Application No. 2007-317324 filed on Dec. 7, 2007, the entire contents of which are being incorporated herein by reference.

BACKGROUND

The present disclosure relates to a 3-dimensional operation input apparatus for operating a GUI (Graphical User Interface), a control apparatus for controlling the GUI in accordance with operational information, a control system including those apparatuses, a handheld apparatus, and a control method.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Documents 1, 2, and 3).

Patent Document 1 discloses an input apparatus including angular velocity gyroscopes of two axes, that is, two angular velocity sensors. Each angular velocity sensor is a vibration-type angular velocity sensor. For example, upon application of an angular velocity with respect to a vibrating body piezo-electrically vibrating at a resonance frequency, Coriolis force is generated in a direction orthogonal to a vibration direction of the vibrating body. The Coriolis force is in proportion to the angular velocity, so detection of the Coriolis force leads to detection of the angular velocity. The input apparatus of Patent Document 1 detects angular velocities about two orthogonal axes by the angular velocity sensors, generates, in accordance with the angular velocities, a signal as positional information of a cursor or the like displayed by a display means, and transmits it to a control apparatus.

Moreover, Patent Document 3 discloses a 3-dimensional operation input apparatus that includes an operation member capable of moving within a window hole provided on an upper surface of a casing by being slid 2-dimensionally. The input apparatus disclosed in Patent Document 3 outputs positional information of the operation member with respect to the window hole to an apparatus main body. The apparatus main body executes processing involving moving a position of a cursor based on the positional information or the like.

Incidentally, input apparatuses that output a movement of a casing itself as a movement amount of a cursor, the input apparatuses being typified by the input apparatuses disclosed in Patent Documents 1 and 2, are generally provided with, in addition to various sensors for detecting movements of the casing, a command input key mainly typified by left and right buttons or a wheel button of a mouse. When issuing some kind of a command to an icon as an operation target, a user operates a pointing device to place a pointer (cursor) on an arbitrary icon and presses the command input key. However, there are cases where, when the user performs an input with the command input key using the 3-dimensional operation input apparatus, the pointing device itself is moved by an operation caused when the command input key is pressed, and the pointer is consequently moved according to the pointing device. As a result, there arises a problem that operations unintended by the user are made, like the pointer is moved from the icon as the operation target and a command cannot be issued, or, though intended for a click operation, by the pointer moving while the user is pressing the button, a drag operation is made.

To solve the problems as described above, Patent Document 2 discloses processing in which, while an enter operation is being made by the pointing device (remote commander), that is, while the button is pressed, the pointer is not moved.

Patent Document 1: Japanese Patent Application Laid-open No. 2001-56743 (paragraphs [0030] and [0031], FIG. 3)
Patent Document 2: Japanese Patent No. 3,264,291 (paragraphs [0062] and [0063])
Patent Document 3: Japanese Patent Application Laid-open No. 2005-63228 (paragraphs [0012] and [0026], FIG. 1)

However, for a signal of an enter operation to be generated and a display output of the pointer to be stopped, a user needs to press the button a certain amount since starting the press so that a switch is turned on. Therefore, an operation unintended by the user may be made when the input apparatus is tilted during a period from when the user has started to press the button to when the switch is turned on.

In the pointing device (remote-controller-type input apparatus) disclosed in Patent Document 3, the user moves the operation member inside the window hole with a thumb to thus move the pointer to an arbitrary icon on the screen, and thereafter carries out an enter operation by pressing the operation member. Also in this case, the operation member may move inside the window hole during a period from when the user has started to press the operation member to when the switch is turned on, with the result that an operation unintended by the user is made. In this case, in particular, there is a problem that, as long as the user does not press the operation member vertically with respect to the pointing device, the pointer moves on the screen before the switch is turned on.

Therefore, it is desired to provide techniques of an input apparatus, a control apparatus, and the like with which an image displayed on a screen can be prevented from being moved unintentionally in a case where a user operates an operation section provided to the input apparatus.

SUMMARY

According to an embodiment, there is provided an input apparatus detecting a physical amount for moving an image displayed on a screen, including: an operation section; a detection means for detecting the physical amount; a storage means for storing a displacement corresponding amount that corresponds to a displacement amount of the image on the screen, the displacement amount corresponding to the physical amount; a generation means for generating an operation signal based on an operation made to the operation section; a calculation means for calculating a first correction displacement amount for correcting coordinate values of the image on the screen based on the displacement corresponding amount stored by the storage means during a period starting from a point that is a first time period before a start of the generation of the operation signal to when the generation of the operation signal is started; and an output means for outputting the displacement corresponding amount and the first correction displacement amount.

The "image" includes a pointer, an icon, a window, a map, an electronic program guide (EPG (Electronic Program Guide)), and the like that are displayed on the screen.

In the input apparatus according to the embodiment, when the generation of the operation signal is started by the generation means, the first correction displacement amount is calculated based on the displacement corresponding amount stored by the storage means. Using the first correction displacement amount, the coordinate values of the image (e.g., pointer) obtained before the operation signal is generated, that is, before the switch is turned on can be corrected. Accordingly, an unintentional movement of the pointer before the switch is turned on can be prevented.

The input apparatus may further include a determination means for determining the first time period every time the generation of the operation signal is started.

Accordingly, for example, a large value is determined for the first time period when an unintentional movement of the image before the switch is turned on is large, whereas a small value is determined for the first time period when the unintentional movement of the pointer is small. By thus determining the first time period every time the input of the operation signal is started, a first correction displacement amount that corresponds to a level of the unintentional movement of the image can be calculated appropriately.

The input apparatus may further include a judgment means for judging backwardly from the start of the generation of the operation signal whether an absolute value of the displacement corresponding amount stored by the storage means falls below a threshold value, and the determination means may determine the first time period with a time when, going back from the start of the generation of the operation signal, the displacement corresponding amount that is the first to fall below the threshold value is stored by the storage means as a reference.

In many cases, the user uses the input apparatus to move the pointer to an icon and place it on the icon, and thereafter performs an input operation with respect to the operation section. In this case, the absolute value of the displacement corresponding amount stored by the storage means approaches 0 due to the stop of the pointer and is increased due to an unintentional movement of the pointer caused by the input operation. Specifically, the displacement amount corresponding to an amount of the unintentional movement of the pointer is, in many cases, a displacement amount calculated based on the displacement corresponding amount stored by the storage means during a period from when the displacement corresponding amount has become a value close to 0 to when the operation signal is input.

In the embodiment, the first time period is determined with a time when, going back from the start of the generation of the operation signal, the displacement corresponding amount that falls below the threshold value is stored by the storage means for the first time as a reference, and the first correction displacement amount is calculated based on the displacement corresponding amount stored by the storage means within the first time period.

Accordingly, since the first correction displacement amount that corresponds to a level of the unintentional movement of the pointer is calculated, a position at which the pointer is displayed can be corrected appropriately.

In the input apparatus, the storage means may store a change rate of the displacement corresponding amount, the input apparatus may further include a judgment means for judging backwardly from the start of the generation of the operation signal whether the change rate of the displacement corresponding amount stored by the storage means is a positive value or a negative value, and the determination means may determine the first time period with a time when, going back from the start of the generation of the operation signal, the change rate of the displacement corresponding amount that is the first to shift from the positive value to the negative value is stored by the storage means as a reference.

When a user moves the pointer to an icon, the pointer approaches the icon while slowing down, and thus the change rate of the displacement corresponding amount becomes a negative value, for example. When the user stops the pointer on the icon, the change rate of the displacement corresponding amount becomes a negative value close to 0, for example, and thereafter becomes, for example, a positive value due to the unintentional movement of the pointer caused by the input operation of the user. In other words, the displacement amount corresponding to an amount of the unintentional movement of the pointer is, in many cases, a displacement amount calculated based on the displacement corresponding amount stored by the storage means during a period from when the change rate of the displacement corresponding amount is shifted from the negative value to the positive value to when the operation signal is input.

In the embodiment, going back from the start of the generation of the operation signal, a judgment is made on the displacement corresponding amount whose change rate is the first to shift from the positive value to the negative value, and the first time period is determined with the time when the displacement corresponding amount is stored as a reference. The input apparatus according to the present invention calculates the first correction displacement amount based on the displacement corresponding amount stored by the storage means within the first time period.

Accordingly, since the first correction displacement amount that corresponds to a level of the unintentional movement of the pointer is calculated, a position at which the pointer is displayed can be corrected appropriately.

In the input apparatus, the calculation means may calculate a second correction displacement amount for correcting the coordinate values of the image on the screen based on the displacement corresponding amount stored by the storage means during a period starting from a point that is a second time period before a stop of the generation of the operation signal to when the generation of the operation signal is stopped, and the output means may output the second correction displacement amount.

In the embodiment, the second correction displacement amount is calculated and output when the generation of the operation signal is stopped. Accordingly, the unintentional movement of the pointer before the generation of the operation signal is stopped, that is, before the switch is turned off can be prevented.

The input apparatus may further include a variable means for varying the first time period.

Accordingly, the first time period that matches a sense of the user can be set arbitrarily.

The input apparatus may further include an output control means for controlling the output means to stop outputting the displacement corresponding amount or output the displacement corresponding amount set to 0 during a predetermined time period since the start of the generation of the operation signal.

Accordingly, since the output of the displacement corresponding amount is stopped or the displacement corresponding amount is output as 0 during the predetermined time period since the start of the generation of the operation signal, the pointer can be prevented from being moved unintentionally even after the switch is turned on and the generation of the operation signal is started. Furthermore, since the displacement corresponding amount is output after an elapse of the predetermined time period since the start of the generation of the operation signal, a drag operation can be displayed on the screen, for example.

The input apparatus may further include an output control means for controlling the output means to stop outputting the displacement corresponding amount or output the displacement corresponding amount set to 0 during a predetermined time period since a stop of the generation of the operation signal.

Accordingly, the pointer can be prevented from being moved unintentionally even after the generation of the operation signal is stopped and the switched is turned off.

In the input apparatus, the output means may output an operation command corresponding to the operation signal, and the input apparatus may further include an output control means for controlling the output means to output the first correction displacement amount when the generation of the operation signal is started and output the operation command after the first correction displacement amount is output.

Accordingly, the operation command can be output to, for example, a control apparatus that receives various signals from the input apparatus after the first correction displacement amount is output. Accordingly, processing of selecting an icon on the screen can be executed after the unintentional movement of the pointer before the switch is turned on is corrected, for example.

In the input apparatus, the output control means may control the output means to output the operation command after the generation of the operation signal is stopped after the first correction displacement amount is output.

In the embodiment, the operation command is output to the control apparatus after the generation of the operation signal is stopped, that is, after the switch is turned off. It should be noted that in a generally-used control apparatus, predetermined processing is often executed with a cancel of an input of an operation signal as a trigger.

In the input apparatus, the output means may output an operation command corresponding to the operation signal, and the input apparatus may further include an output control means for controlling the output means to output the second correction displacement amount when the generation of the operation signal is stopped and output the operation command after the second correction displacement amount is output.

Accordingly, the operation command can be output to the control apparatus after the second correction displacement amount is output. Therefore, processing of selecting an icon on the screen can be executed after an unintentional movement amount of the pointer before the switch is turned off is corrected, for example.

The input apparatus may further include a casing, and the detection means may be a sensor that detects the physical amount that corresponds to a movement of the casing.

The input apparatus may further include a casing including an opening in which the operation section is movable, and the detection means may detect the physical amount with respect to the casing, that corresponds to a movement of the operation section inside the opening.

When the detection means detects the movement of the operation section with respect to the casing, the unintentional movement of the pointer before the switch is turned on is large. In the present invention, since the first correction displacement amount can be used to correct the unintentional movement of the pointer, the pointer can be displayed at an appropriate position that matches an intention of the user even when the user has been unable to press the operation section vertically with respect to the casing, for example.

In the input apparatus, the operation section may be a 2-step-operation-type operation section with which a 2-step switch is possible, the generation means may include a first switch that generates a first operation signal based on an operation made to the 2-step-operation-type operation section and a second switch that generates a second operation signal based on an operation made to the 2-step-operation-type operation section, and the output means may output an operation command corresponding to the second operation signal.

The input apparatus may further include an output control means for controlling, when the generation of the first operation signal is started by the first switch, the output of the displacement corresponding amount by the output means so that the image starts moving, and the calculation means may calculate the first correction displacement amount for correcting the coordinate values of the image on the screen based on the displacement corresponding amount stored by the storage means during a period starting from a point that is the first time period before a start of the generation of the second operation signal by the second switch to when the generation of the second operation signal is started.

The input apparatus may further include an output control means for controlling, when the generation of the first operation signal is started by the first switch, the output of the displacement corresponding amount by the output means so that the image stops moving, and the calculation means may calculate the first correction displacement amount for correcting the coordinate values of the image on the screen based on the displacement corresponding amount stored by the storage means during a period starting from a point that is the first time period before the start of the generation of the first operation signal by the first switch to when the generation of the first operation signal is started.

According to the embodiment, there is provided a control apparatus controlling display of a movement of an image on a screen based on a signal on a physical amount and an operation signal output from an input apparatus including a detection means for detecting the physical amount for moving the image displayed on the screen, an operation section, and a generation means for generating the operation signal based on an operation made to the operation section, the control apparatus including: a reception means for receiving the signal on the physical amount and the operation signal; a storage means for storing a displacement corresponding amount that corresponds to a displacement amount of the image on the screen, the displacement amount corresponding to the physical amount; a calculation means for calculating a first correction displacement amount for correcting coordinate values of the image on the screen based on the displacement corresponding amount stored by the storage means during a period starting from a point that is a first time period before a start of the reception of the operation signal to when the reception of the operation signal is started; and a display control means for controlling the display on the screen so that the image is moved based on the displacement corresponding amount and the first correction displacement amount.

According to the embodiment, there is provided a control system controlling a movement of an image displayed on a screen, including: an input apparatus including a detection means for detecting a physical amount for moving the image, an operation section, a storage means for storing a displacement corresponding amount that corresponds to a displacement amount of the image on the screen, the displacement amount corresponding to the physical amount, a generation means for generating an operation signal based on an operation made to the operation section, a calculation means for calculating a first correction displacement amount for correcting coordinate values of the image on the screen based on the displacement corresponding amount stored by the storage means during a period starting from a point that is a first time period before a start of the generation of the operation signal to when the generation of the operation signal is started, and an output means for outputting the displacement corresponding amount and the first correction displacement amount; and a control apparatus including a reception means for receiving the displacement corresponding amount and the first correction displacement amount, and a display control means for controlling display on the screen so that the image is moved based on the displacement corresponding amount and the first correction displacement amount.

According to the embodiment, there is provided a handheld apparatus controlling a movement of an image displayed on a screen, including: a display section to display the screen; a detection means for detecting a physical amount for moving the image; a storage means for storing a displacement corresponding amount that corresponds to a displacement amount of the image on the screen, the displacement amount corresponding to the physical amount; an operation section; a generation means for generating an operation signal based on an operation made to the operation section; a calculation means for calculating a first correction displacement amount for correcting coordinate values of the image on the screen based on the displacement corresponding amount stored by the storage means during a period starting from a point that is a first time period before a start of the generation of the operation signal to when the generation of the operation signal is started; and a display control means for controlling display on the screen so that the image is moved based on the displacement corresponding amount and the first correction displacement amount.

According to the embodiment, there is provided a control method including: detecting a physical amount for moving an image displayed on a screen; generating an operation signal based on an input operation; storing a displacement corresponding amount that corresponds to a displacement amount of the image on the screen, the displacement amount corresponding to the physical amount; calculating a first correction displacement amount for correcting coordinate values of the image on the screen based on the displacement corresponding amount stored by the storage means during a period starting from a point that is a first time period before a start of the generation of the operation signal to when the generation of the operation signal is started; and controlling display on the screen so that the image is moved based on the displacement corresponding amount and the first correction displacement amount.

As described above, according to the embodiments, techniques of an input apparatus, a control apparatus, and the like with which an image displayed on a screen can be prevented from being moved unintentionally in a case where a user operates an operation section provided to the input apparatus can be provided.

Additional features and advantages are described herein, and will be apparent from, the following Detailed Description and the figures.

DETAILED DESCRIPTION

Hereinafter, embodiments of the present invention will be described with reference to the drawings.

Figure 1:
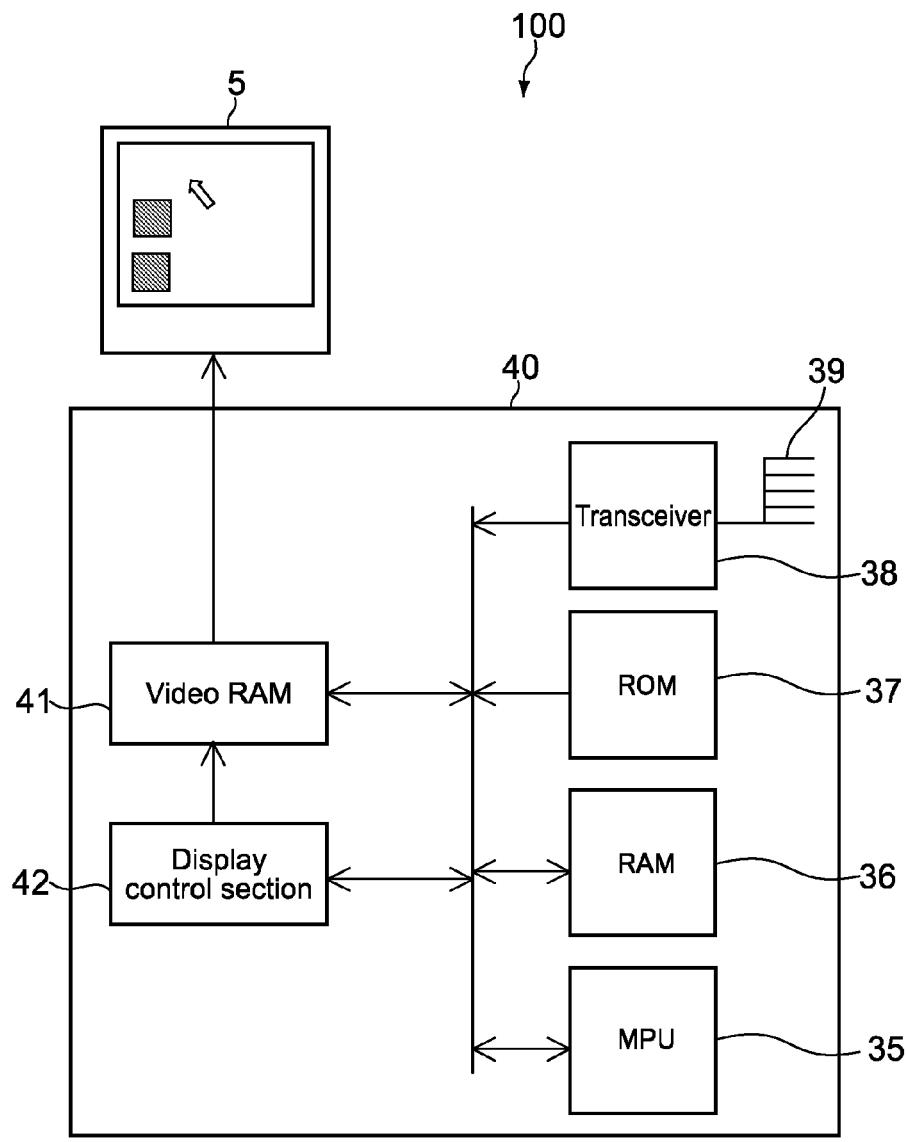
FIG. 1 A diagram showing a control system according to an embodiment.

FIG. 1 is a diagram showing a control system according to an embodiment. A control system 100 includes a display apparatus 5, a control apparatus 40, and an input apparatus 1.

Figure 2:
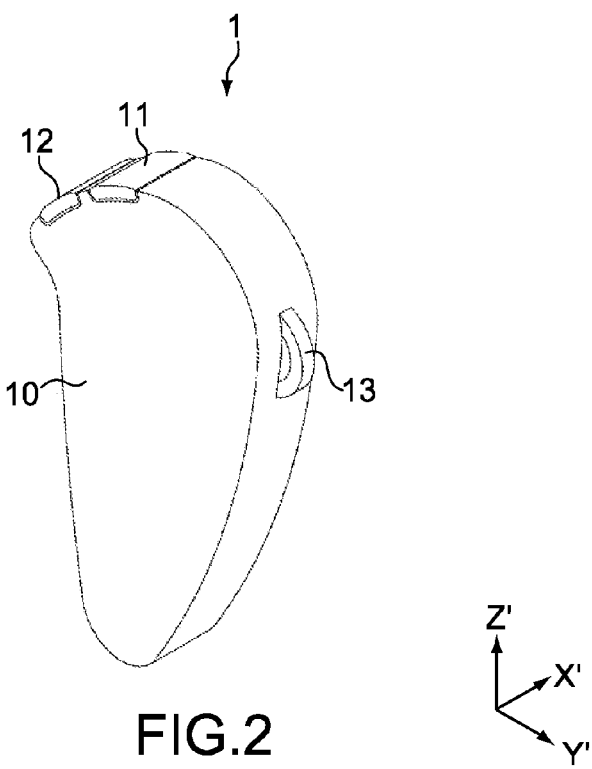
FIG. 2 A perspective diagram showing an input apparatus.

FIG. 2 is a perspective diagram showing the input apparatus 1. The input apparatus 1 is of a size that a user is capable of holding. The input apparatus 1 includes a casing 10. Further, the input apparatus 1 includes an operation section 23 including a button 11 provided at a center of an upper portion of the casing 10, a button 12 adjacent to the button 11, and a button 13 provided on a side surface of the casing.

Typically, the buttons 11 and 12 are each a press-type button, and push buttons or capacitance-type touch buttons are used. Typically, the button 13 is a rotary wheel button. However, the operation section 23 is not limited thereto, and a bar-type operation section 23 that is operated with one end as a fulcrum or a slide-type operation section 23 may be used instead.

The buttons each include a built-in switch (not shown), and the switch generates an operation signal in accordance with an input operation of a user and outputs it to an MPU 19 (generation means). An optical sensor or a capacitance sensor may be used for the switch that outputs operation signals.

The button 11 has a function corresponding to a left button of a mouse as an input device used for a PC, and the button 12 adjacent to the button 11 has a function corresponding to a right button of a mouse, for example. For example, an operation of selecting an icon 4 (see FIG. 5) may be carried out by clicking the button 11, an operation of opening a file may be carried out by double-clicking the button 11, and a scroll operation may be carried out by a rotation of the wheel button. The icons are images on the screen 3 representing functions of programs, execution commands, file contents, and the like on the computer. Locations of the buttons 11 and 12 and the wheel button 13, a content of a command issued, and the like can arbitrarily be changed.

Figure 3:
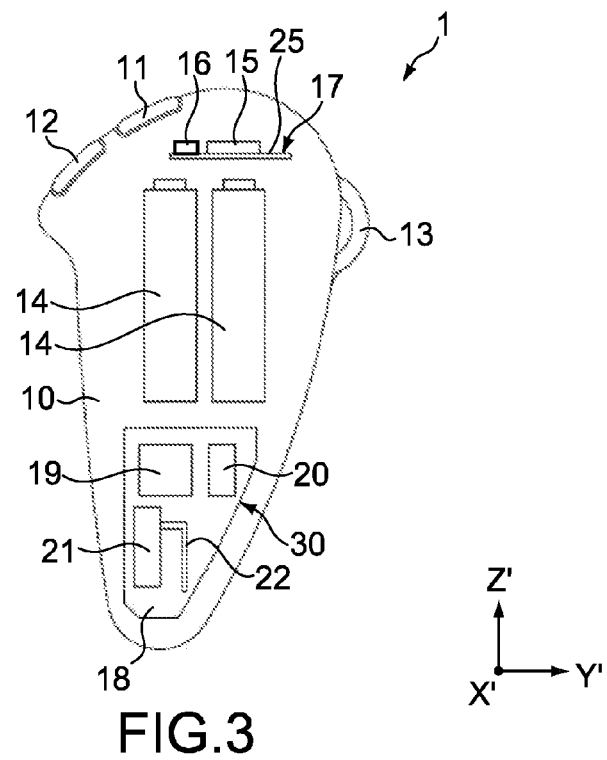
FIG. 3 A diagram schematically showing an internal structure of the input apparatus.
Figure 4:
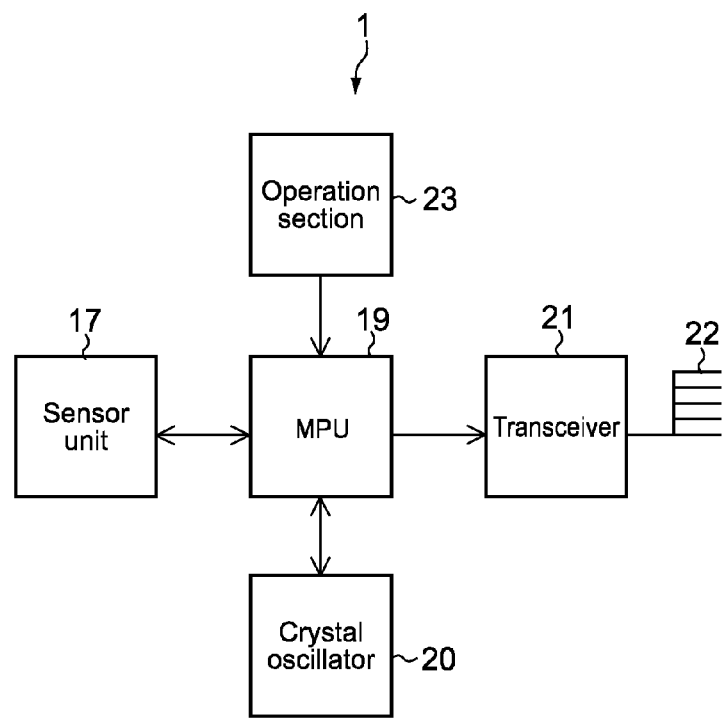
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
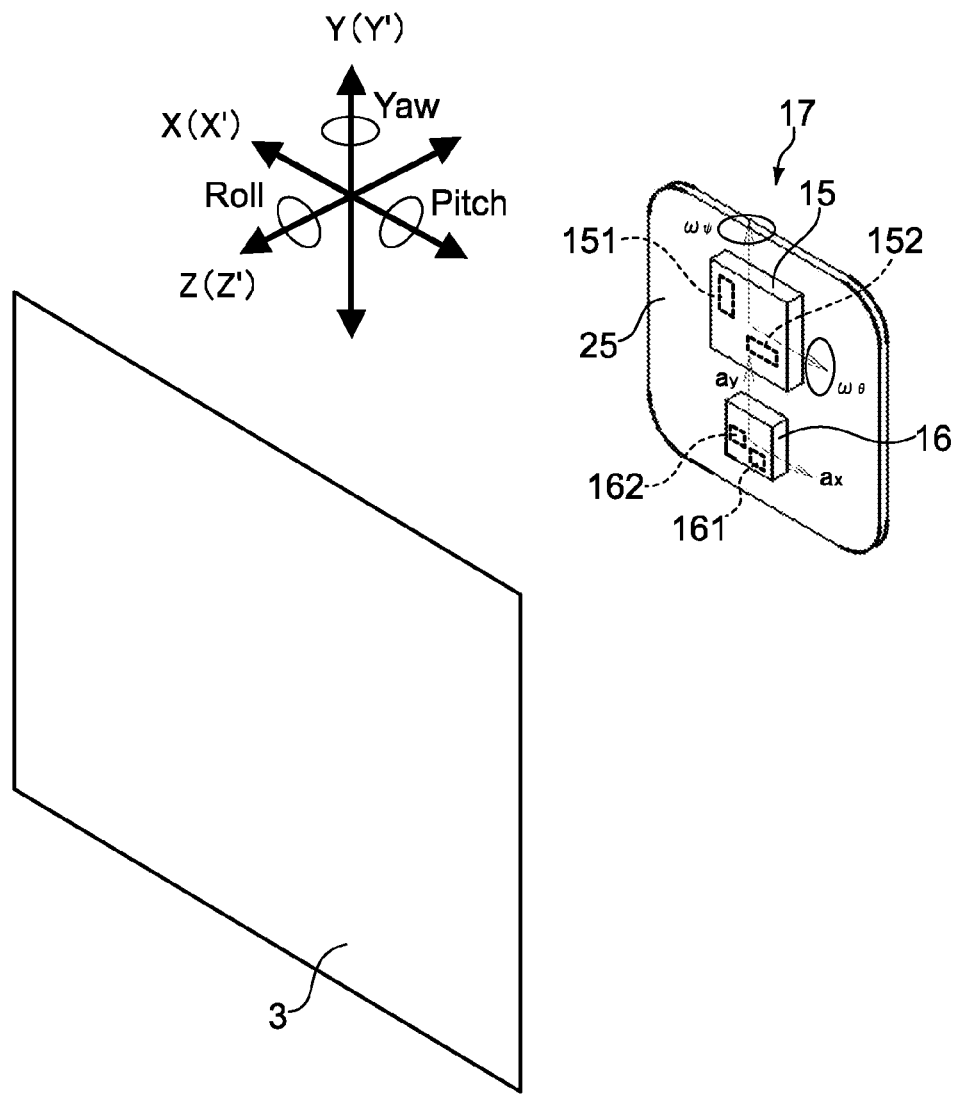
FIG. 8 A perspective diagram showing a sensor unit.

FIG. 8 is a perspective diagram showing the sensor unit 17.

The sensor unit 17 includes an acceleration sensor unit 16 for detecting accelerations in different angles such as along two orthogonal axes (X' axis and Y' axis). Specifically, the acceleration sensor unit 16 includes two sensors, that is, an acceleration sensor 161 for a yaw direction and an acceleration sensor 162 for a pitch direction.

The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152 for a pitch direction. The acceleration sensor unit 16 and the angular velocity sensor unit 15 are packaged and mounted on a circuit board 25.

As each of the first and second angular velocity sensors 151 and 152, a vibration gyro sensor for detecting Coriolis force in proportion to an angular velocity is used. As each of the first and second acceleration sensors 161 and 162, any sensor such as a piezoresistive sensor, a piezoelectric sensor, or a capacitance sensor may be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X' axis and the Y' axis. In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis.

Further, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section 23, and the like, and executes various kinds of operational processing in order to generate predetermined control signals (commands) in response to those input signals.

The transceiver 21 (output means) transmits, as radio signals (e.g., RF radio signals), the command generated in the MPU 19 to the control apparatus 40 via the antenna 22. The transceiver 21 is also capable of receiving various signals transmitted from the control apparatus 40.

The crystal oscillator 20 generates reference pulses and supplies them to the MPU 19. The MPU 19 is capable of generating clocks of various frequencies based on the reference pulses. As the batteries 14, dry cell batteries, rechargeable batteries, and the like are used.

The control apparatus 40 is a computer and includes an MPU 35 (or CPU), a RAM 36, a ROM 37, a video RAM 41, a display control section 42, an antenna 39, and a transceiver 38.

The transceiver 38 receives various signals transmitted from the input apparatus 1 via the antenna 39. The transceiver 38 is also capable of transmitting various predetermined signals to the input apparatus 1.

The MPU 35 analyzes the command and executes various kinds of operational processing. Accordingly, a display control signal for controlling a UI displayed on the screen 3 of the display apparatus 5 is generated. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
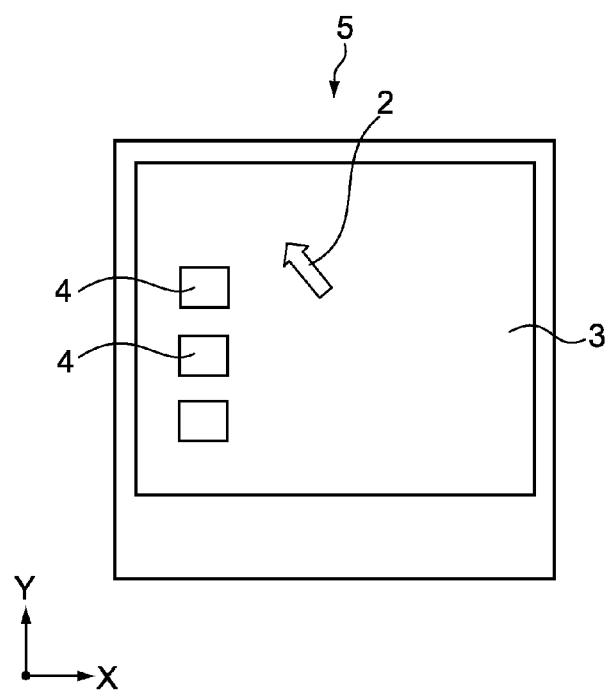
FIG. 5 A diagram showing an example of a screen displayed on a display apparatus.

FIG. 5 is a diagram showing an example of the screen 3 displayed on the display apparatus 5. UIs such as the icons 4 and the pointer 2 are displayed on the screen 3. It should be noted that on the screen 3, the horizontal direction is referred to as X-axis direction and the vertical direction is referred to as Y-axis direction. Unless stated otherwise, to help understand descriptions below, the GUI as an operation target of the input apparatus 1 will be described as being the pointer 2 (so-called cursor).

Figure 6:
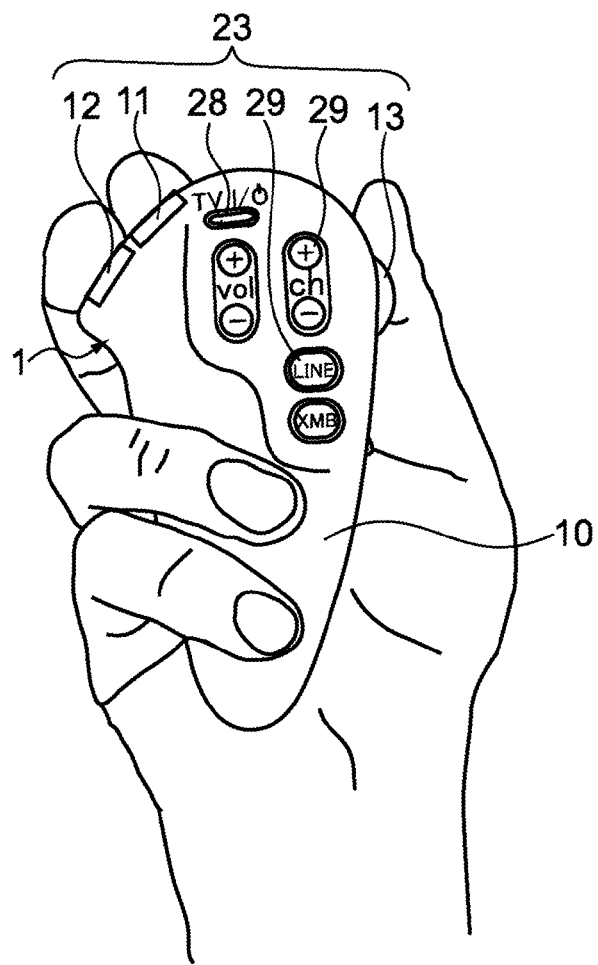
FIG. 6 A diagram showing a state where a user is holding the input apparatus.

FIG. 6 is a diagram showing a state where a user is holding the input apparatus 1. As shown in FIG. 6, the input apparatus 1 may include, as the operation section 23, in addition to the buttons 11, 12, and 13, various operation buttons 29 such as those provided to a remote controller for operating a television or the like and a power supply switch 28, for example. Command signals generated when the user moves the input apparatus 1 in the air or operates the operation section 23 while holding the input apparatus 1 as shown in the figure are output to the control apparatus 40, and the control apparatus 40 controls the UI.

Typically, the MPU 19 of the input apparatus 1 generates, as the command, a movement command that corresponds to a displacement amount of the pointer 2 on the screen 3, the displacement amount corresponding to the detection signal from the sensor unit 17, and an operation command that corresponds to the operation signal input by the user via the operation section 23.

Figure 7:
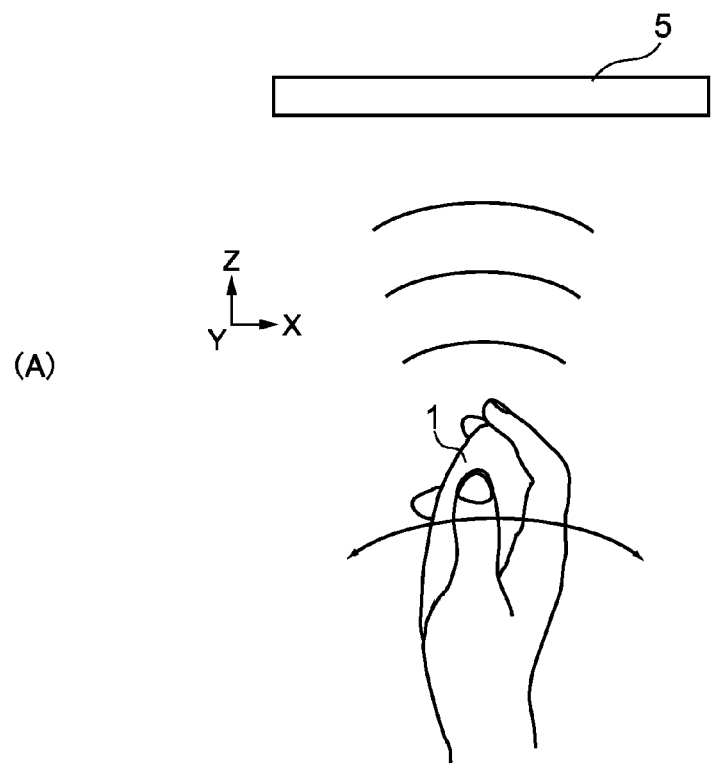
FIG. 7 Explanatory diagrams showing typical examples of ways of moving the input apparatus and ways a pointer moves on the screen accordingly.
Figure 7:
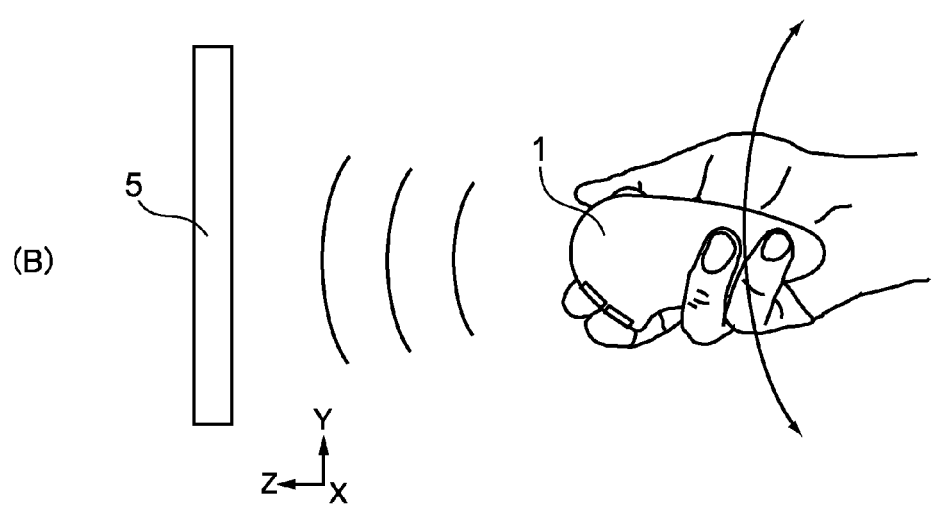

Next, a description will be given on typical examples of ways of moving the input apparatus 1 and ways the pointer 2 moves on the screen 3 accordingly. FIG. 7 are explanatory diagrams therefor.

As shown in FIGS. 7(A) and 7(B), the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7(A) and 7(B) will be referred to as reference position.

As shown in FIG. 7(A), in the reference position, the user swings a wrist or an arm in the lateral direction, that is, the yaw direction. At this time, the first acceleration sensor 161 detects an acceleration value $a_x$ in the yaw direction, and the angular velocity sensor 151 for the yaw direction detects an angular velocity value $\omega_\psi$ about the Y' axis. Based on those detection values, the control apparatus 40 controls display of the pointer 2 so that the pointer 2 moves in the X-axis direction.

Meanwhile, as shown in FIG. 7(B), in the reference position, the user swings the wrist or the arm in the vertical direction, that is, the pitch direction. At this time, the second acceleration sensor 162 for the pitch direction detects an acceleration value $a_y$ in the Y'-axis direction, and the second angular velocity sensor 152 detects an angular velocity value $\omega_\theta$ about the X' axis. Based on those detection values, the control apparatus 40 controls display of the pointer 2 so that the pointer 2 moves in the Y-axis direction.

Next, an operation of the input apparatus 1 will be described.

Figure 9:
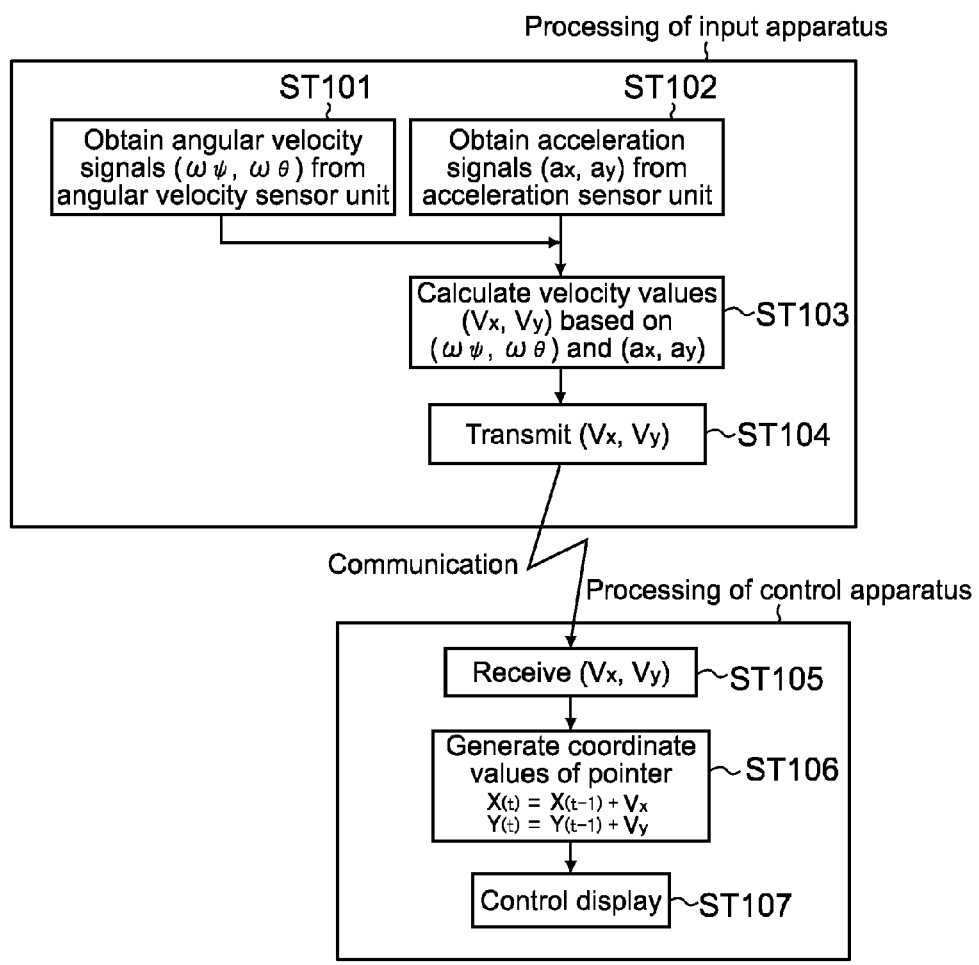
FIG. 9 A diagram for illustrating an operation of the control system in a case where the pointer moves on the screen in accordance with a 3-dimensional operation by the user.

First, an operation of the control system 100 in a case where the pointer 2 moves on the screen 3 in accordance with a 3-dimensional operation of the user will be described briefly. FIG. 9 is a flowchart showing the operation of the control system 100 in this case.

When the user presses the power supply switch 28 and the power of the input apparatus 1 is thus turned on, for example, biaxial angular velocity signals ($\omega_\psi$, $\omega_\theta$) are output from the angular velocity sensor unit. The angular velocity values ($\omega_\psi$, $\omega_\theta$) obtained from the angular velocity signals are input to the MPU 19 (Step 101).

Further, upon turning on the power of the input apparatus 1, biaxial acceleration signals ($a_x$, $a_y$) are output from the acceleration sensor unit 16, and the biaxial acceleration values ($a_x$, $a_y$) are input to the MPU 19 (Step 102). It should be noted that the MPU 19 typically carries out the processes of Steps 101 and 102 in sync every predetermined clock cycle.

Based on the acceleration values ($a_x$, $a_y$) and the angular velocity values ($\omega_\psi$, $\omega_\theta$), the MPU 19 calculates velocity values ($V_x$, $V_y$) by a predetermined operation (Step 103). The velocity value $V_x$ is a velocity value in a direction along the X' axis, and the velocity value $V_y$ is a velocity value in a direction along the Y' axis.

As the method of calculating the velocity values ($V_x$, $V_y$), there is a method in which the MPU 19 calculates the velocity values by, for example, integrating the acceleration values ($a_x$, $a_y$) while using the angular velocity values ($\omega_\psi$, $\omega_\theta$) as an adjunct for the integration operation.

Alternatively, as the method of calculating the velocity values, there is also a method in which the MPU 19 calculates radius gyrations ($R_\psi$, $R_\theta$) of the input apparatus 1 based on the acceleration values ($a_x$, $a_y$) and the angular velocity values ($\omega_\psi$, $\omega_\theta$) from the sensor unit 17, and multiplies the radius gyrations by the angular velocity values ($\omega_\psi$, $\omega_\theta$) to thus obtain velocity values ($V_x$, $V_y$). The radius gyrations ($R_\psi$, $R_\theta$) can be calculated by, for example, dividing the acceleration values ($a_x$, $a_y$) by angular acceleration values ($\Delta\omega_\psi$, $\Delta\omega_\theta$). Alternatively, the radius gyrations ($R_\psi$, $R_\theta$) may be obtained by dividing acceleration change rates ($\Delta a_x$, $\Delta a_y$) by angular acceleration change rates ($\Delta(\Delta\omega_\psi)$, $\Delta(\Delta\omega_\psi)$).

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1. However, the velocity values ($V_x$, $V_y$) do not always need to be calculated by the calculation method above. For example, it is also possible for the velocity values ($V_x$, $V_y$) to be calculated by simply integrating the acceleration values ($a_x$, $a_y$).

Upon calculating the velocity values ($V_x$, $V_y$), the MPU 19 transmits, as the movement command, information on the calculated velocity values to the control apparatus 40 via the transceiver 21 and the antenna 22 (Step 104).

The MPU 35 of the control apparatus 40 receives the information on the velocity values ($V_x$, $V_y$) via the antenna 39 and the transceiver 38 (Step 105). In this case, the input apparatus 1 transmits the velocity values ($V_x$, $V_y$) every predetermined clocks, that is, every time a predetermined time passes, and the control apparatus 40 receives the velocity values every predetermined number of clocks.

Upon receiving the velocity values, the MPU 35 of the control apparatus 40 generates new coordinate values (X(t), Y(t)) by adding the velocity values to coordinate values using Equations (1) and (2) below (Step 106). Based on the generated coordinate values, the display control section 42 controls display so that the pointer 2 moves on the screen 3 (Step 107).

$$X(t)=X(t-1)+V_x \tag{1}$$

$$X(t)=X(t-1)+V_x \tag{1}$$

By such processing, the pointer 2 displayed on the screen 3 moves on the screen 3 in accordance with the 3-dimensional operation of the user.

It should be noted that the calculation of the velocity values ($V_x$, $V_y$) may be executed by the control apparatus 40. In this case, the input apparatus 1 transmits information on the angular velocity values ($\omega_\psi$, $\omega_\theta$) and the acceleration values ($a_x$, $a_y$) to the control apparatus 40 via the transceiver 21 and the antenna 22. Based on the information on the angular velocity values ($\omega_\psi$, $\omega_\theta$) and the acceleration values ($a_x$, $a_y$) received via the antenna 39 and the transceiver 38, the control apparatus 40 calculates the velocity values ($V_x$, $V_y$). The method of calculating the velocity values is as described above.

Next, an embodiment of a case where the user operates the operation section 23 of the input apparatus 1 will be described.

Figure 10:
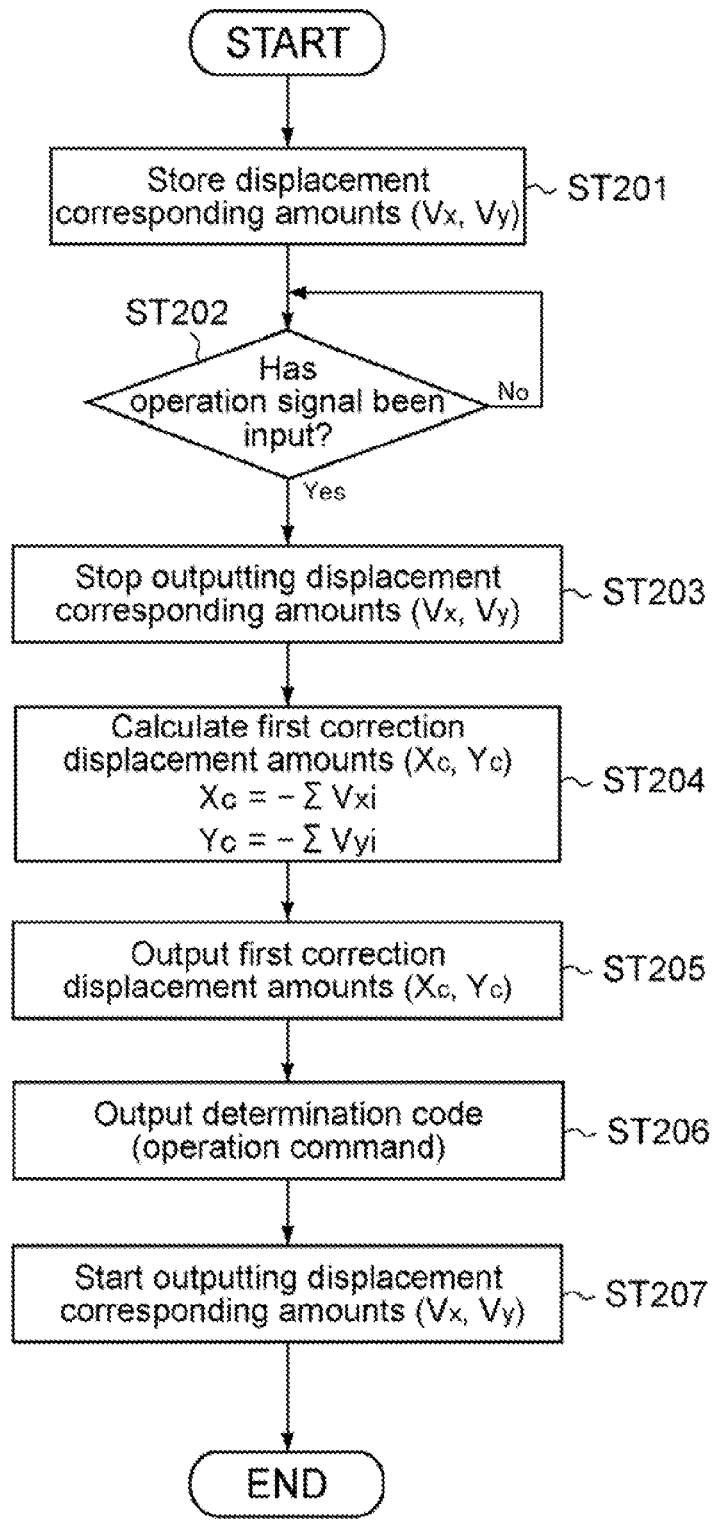
FIG. 10 A flowchart showing an operation in a case where the user operates an operation section of the input apparatus.

FIG. 10 is a flowchart showing an operation of the input apparatus of this embodiment. In this embodiment, a description will be given on a case where the user operates the button 11 out of the operation section 23. It should be noted that in descriptions below, the velocity values will be described as displacement corresponding values. As described above, the velocity values are amounts corresponding to displacements, that is, displacement corresponding amounts of the pointer 2 per predetermined unit time.

Figure 11:
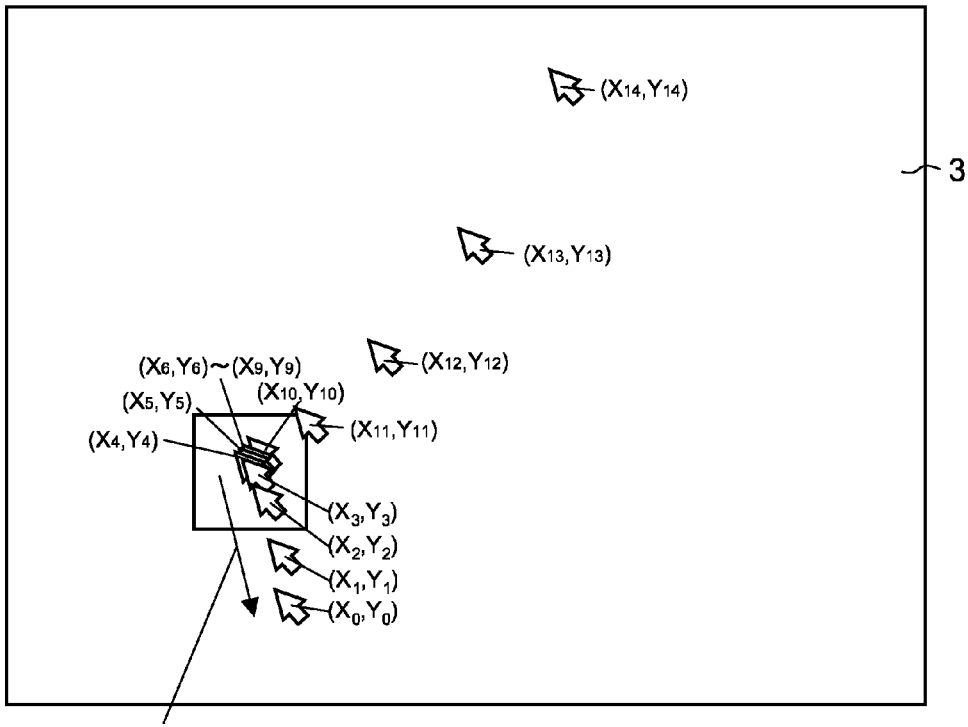
FIG. 11 Diagrams showing an example of a movement of the pointer on the screen.
Figure 11:
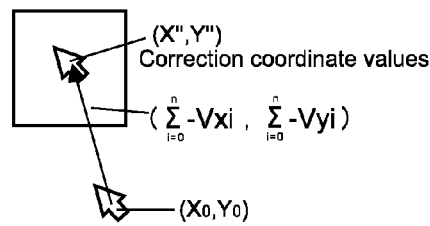

FIG. 11 are diagrams showing an example of the movement of the pointer 2 on the screen 3. FIG. 11(A) is a diagram showing an example of the movement of the pointer in a case where the user moves the pointer on the screen 3 using the input apparatus 1 of this embodiment and presses the button 11 on the icon 4, and FIG. 11(B) is a diagram showing a first correction displacement amount. It should be noted that in FIG. 11, coordinate values of the pointer 2 on the screen 3 obtained when the MPU 19 is input with the operation signal are represented by $X_0$, $Y_0$, and coordinate values of the pointer i cycles before the input of the operation signal are represented by $X_i$, $Y_i$.

Figure 12:
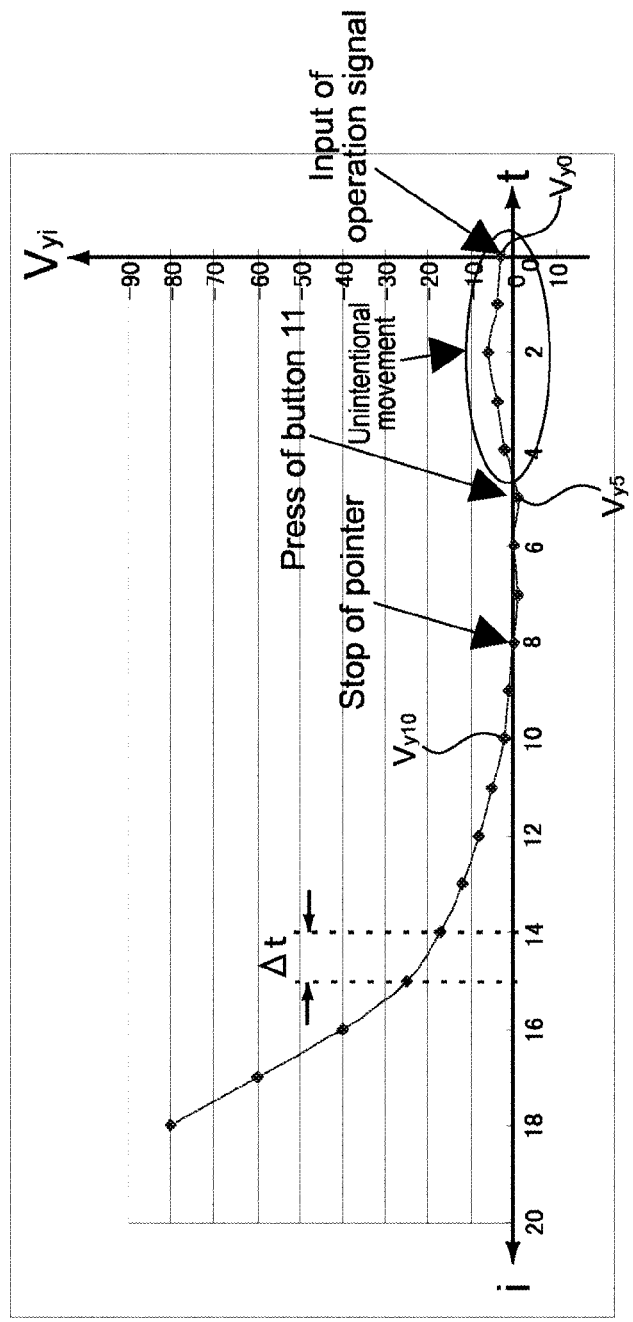
FIG. 12 A diagram showing a displacement corresponding amount stored in the input apparatus in a case where the pointer takes the movement shown in FIG. 11.

FIG. 12 is a diagram showing a displacement corresponding amount stored in the input apparatus 1 according to this embodiment in a case where the pointer 2 takes the movement shown in FIG. 11. It should be noted that in FIG. 12, a displacement corresponding amount stored at a time when the generation of the operation signal is started (start of input) is represented by $V_{y0}$, and a displacement corresponding amount stored i cycles before the start of the generation of the operation signal (start of input) is represented by $V_{yi}$.

Figure 13:
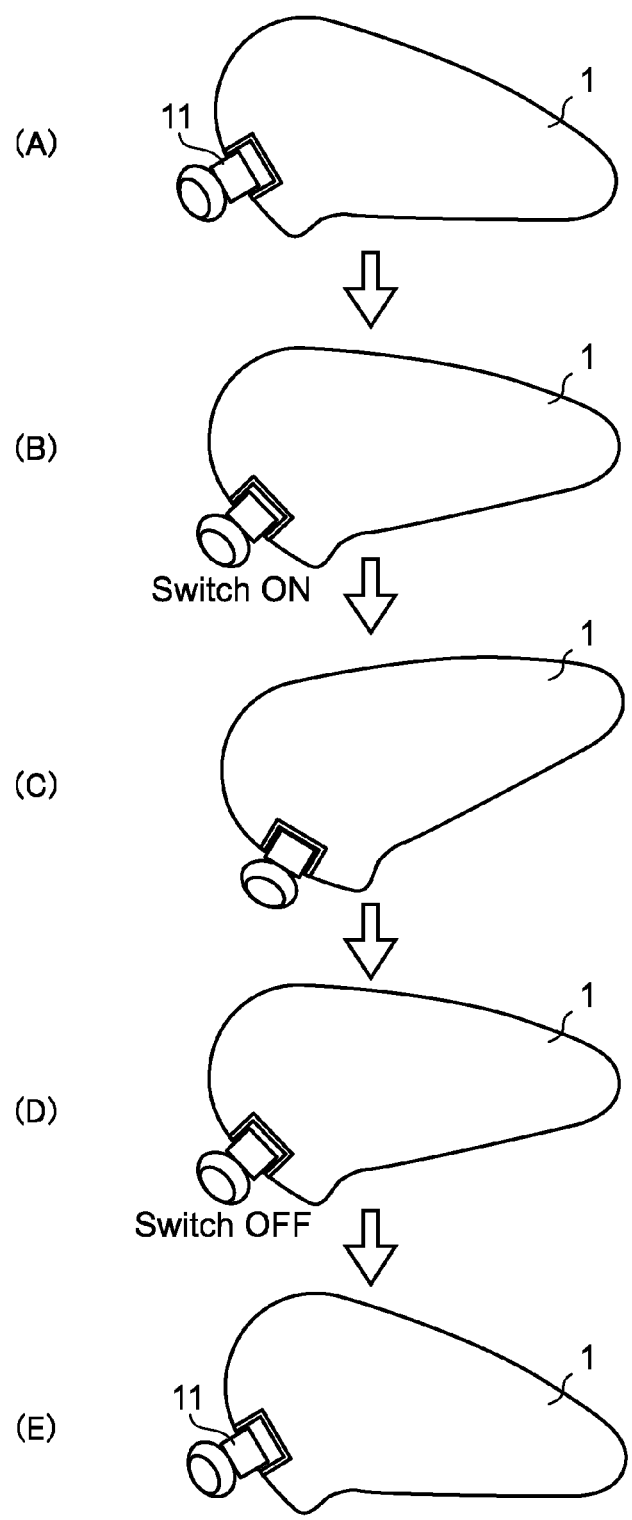
FIG. 13 Schematic diagrams showing a movement of a casing from when the user has started to press a button to when the press is released.

FIG. 13 are schematic diagrams showing a movement of the casing from when the user has pressed the button 11 to when the press is released.

As shown in FIG. 10, the input apparatus 1 stores displacement corresponding amounts ($V_x$, $V_y$) in a built-in volatile memory (not shown) of the MPU 19, for example (Step 201) (storage means). In this case, the displacement corresponding amounts as shown in FIG. 12 are stored in the memory, for example. In the memory, displacement corresponding amounts calculated based on the angular velocity values ($\omega_\psi$, $\omega_\theta$) and the acceleration values ($a_x$, $a_y$) are stored every predetermined number of clocks at predetermined cycles.

As shown in FIG. 13, when the user starts to press the button 11 (FIG. 13(A)), the button 11 is pressed into the casing 10 and the switch is turned on (FIG. 13(B)). In this case, due to the movement of the casing 10, the sensor unit 17 detects physical amounts ($\omega_\psi$, $\omega_\theta$, $a_x$, $a_y$), and displacement corresponding amounts corresponding to the physical amounts are output from the input apparatus 1. As a result, the coordinate values of the pointer 2 on the screen 3 move from ($X_5$, $Y_5$) to ($X_0$, $Y_0$), for example, as shown in FIG. 11(A).

When turned on, the switch starts generating an operation signal and starts outputting the operation signal to the MPU 19. Upon being input with the operation signal (YES in Step 202), the MPU 19 stops outputting the displacement corresponding amounts or starts outputting a signal with the displacement corresponding amounts set to 0 (($V_x$, $V_y$)=(0, 0)) (Step 203).

Accordingly, the pointer 2 can be prevented from making moves unintended by the user after the switched is turned on. In the example shown in FIG. 13, the pointer 2 can be prevented from moving on the screen 3 due to the casing 10 moving additionally from the state where the switch is turned on (FIG. 13(B)) (FIG. 13(C)).

When the generation of the operation signal by the switch is started and the input of the operation signal is started, the MPU 19 reads out the displacement corresponding amount stored in the memory during a period starting from a point that is a first time period before the start of the input of the operation signal to when the input of the operation signal is started, and integrates the displacement corresponding amounts to thus calculate first correction displacement amounts ($X_c$, $Y_c$) (Step 204) (calculation means).

Typically, assuming that the displacement corresponding amounts stored in the memory i cycles before the start of the input of the operation signal are represented by $V_{xi}$, $V_{yi}$, the MPU 19 adds values obtained by multiplying the displacement corresponding amounts from i=0 to i=n by -, to thus calculate the first correction displacement amounts. This relationship is expressed in Equations (3) and (4) below.

$$X_c = \Sigma - V_{xi} \quad (3)$$

$$Y_c = \Sigma - V_{yi} \quad (4)$$

Moreover, assuming that a cycle time period during which the displacement corresponding amount is stored in the memory is represented by $\Delta t$, the first time period can be expressed by Equation (5) below.

$$t_1 = \Delta t * n \quad (5)$$

The first time period $t_1$ is typically 0.1 sec to 0.6 sec, but may be 0.1 sec or less or 0.6 sec or more. It is also possible to allow the user to customize the first time period. For realizing such customization by the user, the input apparatus 1 may be provided with, for example, a DIP switch or a variable resistor. Further, it is also possible to allow the user to perform customization by operating a GUI on the screen 3 by operating the input apparatus 1 and the operation section 23. The same holds true for a second time period to be described later.

It should be noted that, as is apparent from Equation (5), if the first time period $t_1$ is determined, n is determined. Oppositely, if n is determined, the first time period $t_1$ is determined. Therefore, the first time period may be set to be 0.1 sec to 0.6 sec by determining n by a DIP switch or a variable resistor. For example, when the cycle time period $\Delta t$ is 0.1 sec, n is set to be 10 to 60.

Upon calculating the first correction displacement amounts, the MPU 19 transmits the calculated first correction displacement amounts (Step 205).

Upon receiving the first correction displacement amounts transmitted from the input apparatus 1 side via the transceiver 38, the MPU 35 of the control apparatus 40 adds the first correction displacement amounts ($X_c$, $Y_c$) to the coordinate values ($X_0$, $Y_0$) obtained at the time when the input of the operation signal is started as shown in Equations (6) and (7) below, to thus calculate correction coordinate values (X", Y"). Upon calculating the correction coordinate values, the MPU 35 controls display of the screen 3 so that the pointer 2 moves to a position of the correction coordinate values (X", Y") as shown in FIG. 11(B).

$$X'' = X_0 + X_c \quad (6)$$

$$Y'' = Y_0 + Y_c \quad (7)$$

After outputting the first correction displacement amounts, the MPU 19 of the input apparatus 1 outputs a determination code (type of operation command) (Step 206).

Upon receiving the determination code output from the input apparatus 1, the MPU 35 of the control apparatus 40 executes predetermined processing. For example, when a position of the pointer 2 on the screen 3 is on the icon 4 as shown in FIG. 11(B), the MPU 35 of the control apparatus 40 execute processing of selecting that icon 4 or activates an application program corresponding to that icon 4. When the position of the pointer 2 at the time the button 11 is pressed is not on the icon 4, the control apparatus 40 executes other processing.

Upon outputting the determination code, the MPU 19 of the input apparatus starts outputting displacement corresponding amounts (Step 207).

By the operation shown in FIG. 10, unintentional movements of the pointer during a period from when the user has started to press the button 11 to when the switch is turned on (see FIGS. 11(A) and 11(B)) can be prevented. Furthermore, by outputting the determination code after outputting the first correction displacement amounts, processing unintended by the user can be prevented from being executed on the screen 3.

In the description on FIG. 10, the case where, regarding the correction displacement amount $X_c$ in the X'-axis direction and the correction displacement amount $Y_c$ in the Y'-axis direction, the correction displacement amounts $(X_c, Y_c)$ in both axis directions are output has been described. However, the present invention is not limited thereto, and the MPU 19 may output only the correction displacement amount $X_c$ in the X'-axis direction or the correction displacement amount $Y_c$ in the Y'-axis direction. In other words, the correction displacement amount $(X_c, Y_c)$ to be output only needs to be selected as appropriate while taking into account a position of the button 11 with respect to the casing and a direction of the unintentional movement of the pointer 2.

Figure 14:
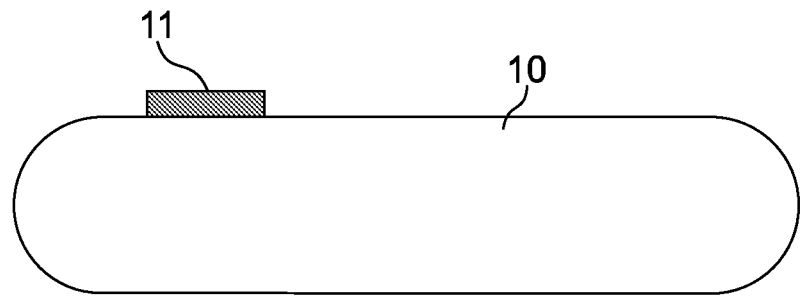
FIG. 14 Schematic diagrams for illustrating a relationship between a position of the button with respect to the casing and an unintentional movement direction of the pointer.
Figure 14:
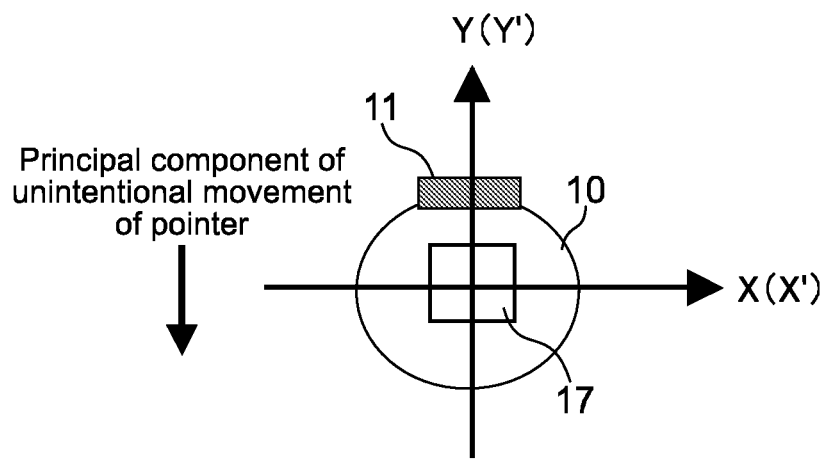

FIG. 14 are schematic diagrams for illustrating a relationship between the position of the button with respect to the casing and the unintentional movement direction of the pointer 2. FIG. 14(A) is a side view of the input apparatus and FIG. 14(B) is a front view of the input apparatus.

As shown in FIG. 14, when the button 11 is provided on the upper surface of the casing 10, the unintentional movement of the pointer 2 is in the Y-axis direction on the screen 3 in most cases. Thus, the input apparatus may output only the correction displacement amount $Y_c$ in the Y'-axis direction. On the other hand, when the button 11 is provided on the side surface of the casing 10, for example, the unintentional movement of the pointer 2 is in the X-axis direction on the screen in most cases. Thus, the input apparatus may output only the correction displacement amount $X_c$ in the X'-axis direction.

In the description on FIG. 10, the MPU 19 has output the determination code immediately after outputting the first correction displacement amounts. However, the present invention is not limited thereto, and the MPU 19 may output the determination code when the input of the operation signal is canceled. In other words, the MPU 19 may output the determination code after waiting for the user to release the press of the button 11 so that the input of the operation signal from the switch is canceled. It should be noted that with a planar-operation-type mouse or the like, a determination code (determination command) is often output with a release of a pressed button as a trigger.

The processing shown in FIG. 10, that is, the processing on the calculation of the correction displacement amounts may be executed by the control apparatus 40. In this case, the control apparatus 40 receives the displacement corresponding amounts and the operation signal transmitted from the input apparatus 1 (reception means). The control apparatus 40 stores the displacement corresponding amounts in, for example, a built-in volatile memory of the MPU 35. Upon start of the reception of the operation signal via the transceiver 38, the MPU 35 of the control apparatus 40 integrates the displacement corresponding amounts stored in the memory during a period from a point that is a first time period before the start of the reception to when the operation signal is received, to thus calculate the first correction displacement amounts $(X_c, Y_c)$. The first correction displacement amounts are used to correct the coordinate values of the pointer 2.

Regarding processing of the input apparatus 1 in embodiments to be described below in a case where the user operates the operation section 23, the processing on the calculation of the correction displacement amounts may similarly be executed by the control apparatus 40.

Figure 15:
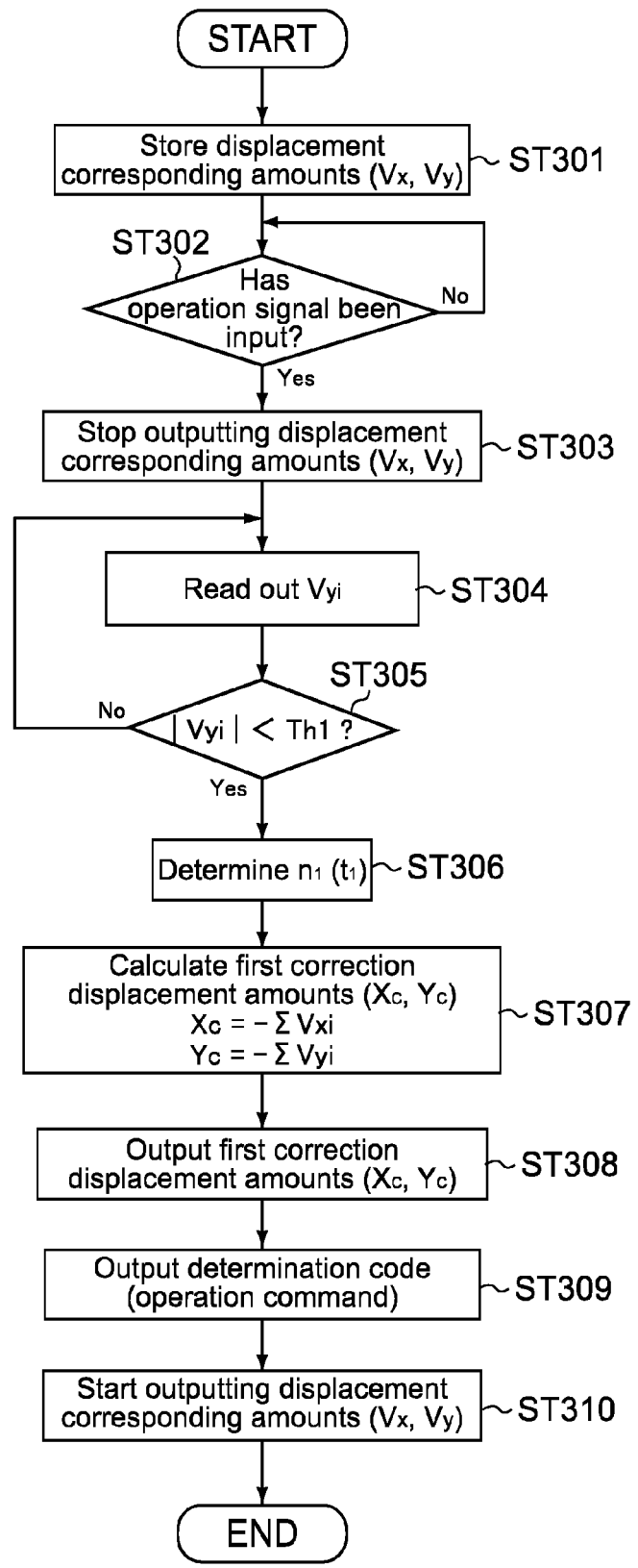
FIG. 15 A flowchart showing an operation of the input apparatus according to another embodiment.

Next, another embodiment of a case where the user operates the operation section 23 of the input apparatus 1 will be described. FIG. 15 is a flowchart showing an operation of the input apparatus 1 of this embodiment. This embodiment mainly describes points different from those of the operation shown in FIG. 10.

In a case where the user selects an icon 4 displayed on the screen 3, the user moves the pointer 2 to the icon 4 as shown in FIG. 11(A) and places the pointer 2 on the icon 4 for about 0.5 sec to 1 sec, and thereafter presses the button 11 in many cases. Therefore, as shown in FIG. 12, the displacement corresponding amounts (velocity values) decrease when the user brings the pointer 2 closer to the icon 4, and the displacement corresponding amounts (velocity values) becomes values close to 0 when the user places the pointer on the icon 4. After that, by the user starting to press the button 11 and the casing 10 being moved by an operation caused by that press (see FIGS. 13(A) and 13(B)), the displacement corresponding amounts (velocity values) increase. Then, the switch is turned on (see FIG. 13(B)) and an operation signal from the switch is input to the MPU 19.

Thus, it can be seen that the movement of the pointer unintended by the user (unintentional movement) corresponds to an integration value of a displacement corresponding amount obtained during a period from when the displacement corresponding amount has become a value close to 0 to when the operation signal is input.

In this embodiment, a transition of the displacement corresponding amount as shown in FIG. 12 is used to determine the first time period.

As shown in FIG. 15, the input apparatus 1 stores displacement corresponding amounts $(V_x, V_y)$ in the built-in volatile memory (not shown) of the MPU 19 (Step 301). In this case, for example, the displacement corresponding amount as shown in FIG. 12 is stored in the memory. When the switch is turned on, the switch starts generating an operation signal and starts outputting the operation signal to the MPU 19. Upon being input with the operation signal from the switch (YES in Step 302), the MPU 19 stops outputting the displacement corresponding amounts (Step 303).

Moreover, when the generation of the operation signal is started by the switch and the input of the operation signal is thus started, the MPU 19 reads out a displacement corresponding amount $V_{yi}$ in the Y'-axis direction that is stored in the memory (Step 304). Then, the MPU 19 judges whether an absolute value of the displacement corresponding amount in the Y'-axis direction $|V_{yi}|$ that has been read out is smaller than a threshold value Th1 (Step 305) (judgment means).

The threshold value Th1 is set to a value close to 0, for example, but is not limited thereto. For example, the threshold value Th1 is set as appropriate in consideration of displacement corresponding amounts at a time the press of the button 11 is started, displacement corresponding amounts at a time when the input of the operation signal is started, and the like (see FIG. 12).

In Step 304, the MPU 19 first reads out a displacement corresponding amount $V_{y0}$ stored in the memory that is obtained at a time the input of the operation signal is started. The MPU 19 judges whether an absolute value of the displacement corresponding amount obtained at the time the input of the operation signal is started is smaller than the threshold value Th1 (Step 305). When the absolute value of the displacement corresponding amount $V_{y0}$ obtained at the time the input of the operation signal is started is equal to or larger than the threshold value (NO in Step 305), a displacement corresponding amount $V_{y1}$ stored in the memory one cycle before the start of the input of the operation signal is read out (Step 304), and a judgment is made on whether an absolute value of the displacement corresponding amount is smaller than the threshold value (Step 305).

Moreover, when the absolute value of the displacement corresponding amount $V_{y1}$ of one cycle before is equal to or larger than the threshold value (NO in Step 305), the next displacement corresponding amount is read out (Step 304) and subjected to a threshold-value judgment (Step 305). As described above, when the absolute value of the displacement corresponding amount is equal to or larger than the threshold value, the displacement corresponding amount stored in the memory is read out backwardly from a time when the input of the operation signal from the switch is started, and a threshold-value judgment is made on the read-out displacement corresponding amount.

On the other hand, when the absolute value $|V_{yi}|$ of the displacement corresponding amount read out from the memory is smaller than the threshold value (YES in Step 305), n is determined (determination means). In other words, n is determined with a time when, going back from the start of the input of the operation signal, the displacement corresponding amount that falls below the threshold value is stored for the first time as a reference.

When the threshold value is set to 3 in the example shown in FIG. 12, for example, n=4 is determined since an absolute value $|V_{y4}|$ of the displacement corresponding amount stored in the memory 4 cycles before the start of the input of the operation signal is the first to fall below the threshold value. It should be noted that by determining n, the first time period $t_1$ is also determined (see Equation (5)).

Upon determining n in Step 306, the MPU 19 adds values obtained by multiplying the displacement corresponding amounts from i=0 to i=n, that are stored in the memory, by –, to thus calculate first correction displacement amounts ($X_c$, $Y_c$) (Step 307) (see Equations (3) and (4)). Upon calculating the correction displacement amounts ($X_c$, $Y_c$), the MPU 19 outputs the calculated correction displacement amounts to the control apparatus 40 (Step 308). After that, the MPU 19 outputs a determination code (Step 309) and starts outputting the displacement corresponding amounts (Step 310).

By the operation shown in FIG. 15, the first correction displacement amounts corresponding to displacement amounts of the pointer unintended by the user, that is obtained before the switch is turned on, are calculated every time the input of the operation signal is started. Accordingly, a display position of the pointer 2 can be corrected appropriately every time the user presses the button 11.

In this embodiment, the MPU 19 carries out the threshold-value judgment on the displacement corresponding amount $V_{yi}$ in the Y'-axis direction that is stored in the memory. However, the threshold-value judgment may be carried out on the displacement corresponding amount $V_{xi}$ in the X'-axis direction that is stored in the memory. Alternatively, it is also possible for the MPU 19 to calculate a vector amount of displacement corresponding amounts based on the displacement corresponding amount in the Y'-axis direction and the displacement corresponding amount $V_{xi}$ in the X'-axis direction, and carry out a threshold-value judgment on the vector amount. The same holds true for processing shown in FIG. 16 to be described next.

The displacement corresponding amount on which the threshold-value judgment is to be made only needs to be set as appropriate in consideration of a position of the button 11 with respect to the casing and a direction in which the pointer 2 moves unintentionally.

As described above with reference to FIG. 14, when the button 11 is provided on the upper surface of the casing 10, it is considered that the unintentional movement of the pointer 2 is mostly in the Y-axis direction on the screen 3. Therefore, in this case, the MPU 19 only needs to carry out the threshold-value judgment on the displacement corresponding amount $V_{yi}$ in the Y'-axis direction. On the other hand, when the button 11 is provided on the side surface of the casing 10, for example, it is considered that the unintentional movement of the pointer 2 is mostly in the X-axis direction on the screen. Thus, the MPU 19 only needs to carry out the threshold-value judgment on the displacement corresponding amount $V_{xi}$ in the X'-axis direction.

Incidentally, the displacement corresponding amount stored when the button 11 is pressed and an operation signal is thus input may differ from that of the example shown in FIG. 12. For example, a case where the user has unintentionally pressed the button 11 while moving the pointer 2 closer to the icon 4 on the screen 3 is conceivable. In this case, if the threshold-value judgment is carried out on the displacement corresponding amount backwardly from the start of the input of the operation signal, the displacement corresponding amount stored when the pointer 2 is stopped before being brought closer to the icon 4 becomes the displacement corresponding amount that falls below the threshold value for the first time. If n (first time period $t_1$) is determined with the time when this displacement corresponding amount is stored as a reference, an inappropriate correction displacement amount may be calculated, and a position of the pointer 2 may be brought back.

Therefore, it is also possible not to read out the displacement corresponding amount and not to determine n (first time period $t_1$) when i exceeds a maximum value N as a maximum value possible for i in Step 304. In other words, it is also possible not to calculate the first correction displacement amount in a case where there is no displacement corresponding amount that falls below the threshold value even when the displacement corresponding amounts stored in the memory are read out while going back N times from the start of the input of the operation signal and subjected to the threshold-value judgment.

Here, a case where there is no displacement corresponding amount that falls below the threshold value even when the threshold-value judgment is carried out while going back N times from the start of the input of the operation signal refers to a case where the user has pressed the button 11 while moving the pointer 2, which is often the case that the user has unintentionally pressed the button 11 instead of intentionally pressing it. Thus, in this case, the determination code does not need to be output in Step 309.

Figure 16:
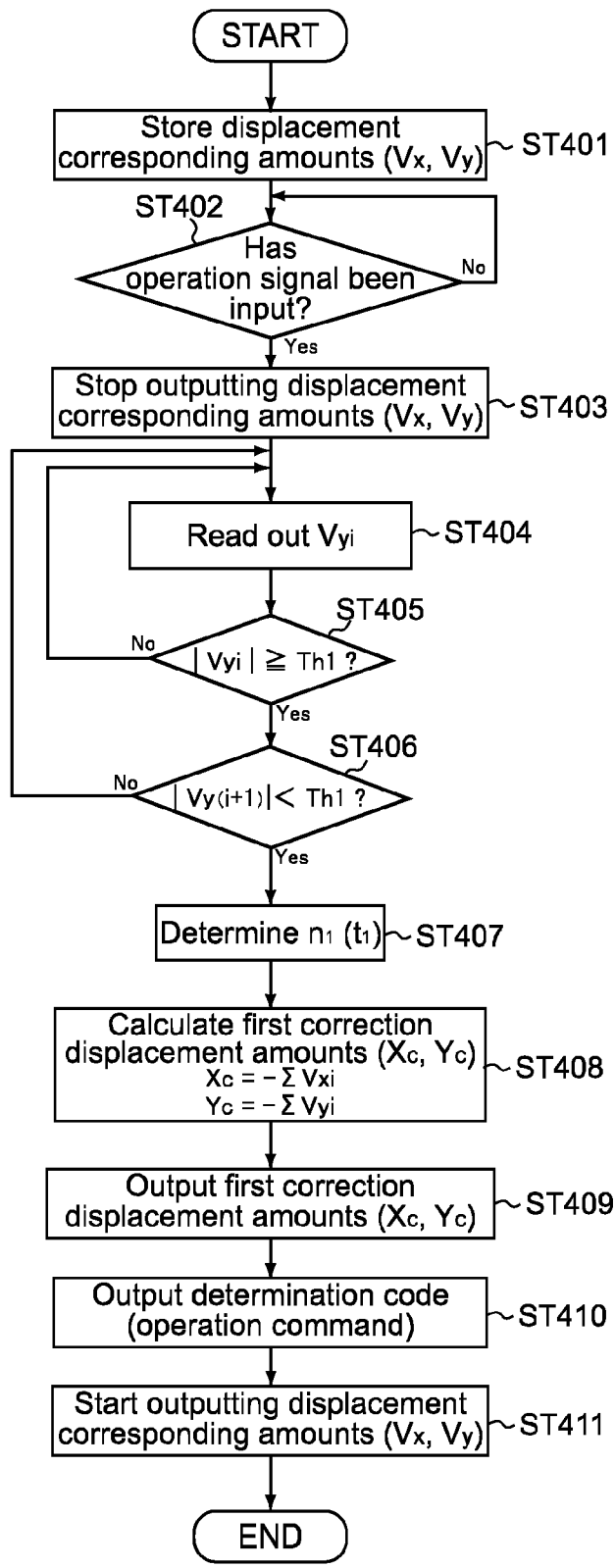
FIG. 16 A flowchart showing an operation of the input apparatus according to still another embodiment.

Next, still another embodiment of a case where the user operates the operation section 23 will be described. FIG. 16 is a flowchart showing an operation of the input apparatus 1 of this embodiment. It should be noted that in this embodiment, points different from those of the operation shown in FIG. 15 will mainly be described.

As shown in FIG. 16, when the switch is turned on, the switch starts generating an operation signal and starts outputting the operation signal to the MPU 19. When the operation signal from the switch is started to be input (Step 402), a displacement corresponding amount $V_{y0}$ stored in the memory at the time the input of the operation signal is started is first read out from the memory (Step 404), and a judgment is made on whether an absolute value $|V_{y0}|$ of the displacement corresponding amount at the time of the input is equal to or larger than the threshold value Th1 (Step 405). It should be noted that this threshold value may either be the same as or different from the threshold value shown in FIG. 15.

When the absolute value of the displacement corresponding amount $V_{y0}$ at the time the input of the operation signal is started is smaller than the threshold value Th1 (NO in Step 405), the next displacement corresponding amount $V_{y1}$ is read out (Step 404), and the read-out displacement corresponding amount $V_{y1}$ is subjected to the threshold-value judgment. When the absolute value of the displacement corresponding amount $V_{yi}$ is smaller than the threshold value Th1, this operation is repeated thereafter (Step 404 to NO in Step 405).

On the other hand, when the absolute value of the displacement corresponding amount $V_{yi}$ is equal to or larger than the threshold value Th1 (YES in Step 405), the MPU 19 reads out a displacement corresponding amount $V_{y(i+1)}$ stored in the memory one cycle before the displacement corresponding amount $V_{yi}$ that is equal to or larger than the threshold value. Then, a judgment is made on whether an absolute value of the read-out displacement corresponding amount $V_{y(i+1)}$ is smaller than the threshold value Th1 (Step 406).

When the absolute value of the displacement corresponding amount $V_{y(i+1)}$ is equal to or larger than the threshold value Th1 (NO in Step 406), the process again returns to Step 404.

On the other hand, when the absolute value of the displacement corresponding amount $V_{y(i+1)}$ is smaller than the threshold value Th1 (YES in Step 406), n is determined based on this displacement corresponding amount (Step 407).

When the threshold value is set to 3 in the example shown in FIG. 12, for example, n=4 is determined since an absolute value $|V_{y3}|$ of the displacement corresponding amount stored in the memory 3 cycles before the start of the generation of the operation signal (start of input) is equal to or larger than the threshold value Th1 (YES in Step 405) and an absolute value $|V_{y4}|$ of the displacement corresponding amount stored in the memory 4 cycles before the start of the generation of the operation signal is smaller than the threshold value Th1 (YES in Step 406) (Step 407). It should be noted that if n is determined, the first time period $t_1$ is also determined.

When n is determined in Step 407, the first correction displacement amounts $(X_c, Y_c)$ are calculated (Step 408) (see Equations (3) and (4)), and the calculated correction displacement amounts are output (Step 409).

Also by the processing shown in FIG. 16, in the same manner as the processing shown in FIG. 15, the display position of the pointer 2 can be corrected appropriately every time the user presses the button 11.

It should be noted that there is also a case where the pointer 2 hardly moves when the user presses the button 11. In this case, there may not exist a portion where $V_{yi}$ is equal to or larger than the threshold value and $V_{y(i+1)}$ is smaller than the threshold value during a period from when the user has started to press the button 11 to when the switch is turned on. Therefore, it is also possible not to read out the displacement corresponding amount and not to determine n (first time period $t_1$) when i exceeds a maximum value N as a maximum value possible for i in Step 404. In other words, it is also possible not to calculate the first correction displacement amount in a case where no displacement corresponding amount that satisfies a condition is stored even when the displacement corresponding amounts stored in the memory are read out while going back N times from the start of the input of the operation signal and subjected to the threshold-value judgment. Alternatively, in this case, the first correction displacement amounts $(X_c, Y_c)$ may be calculated based on preset n (first time period $t_1$).

Figure 17:
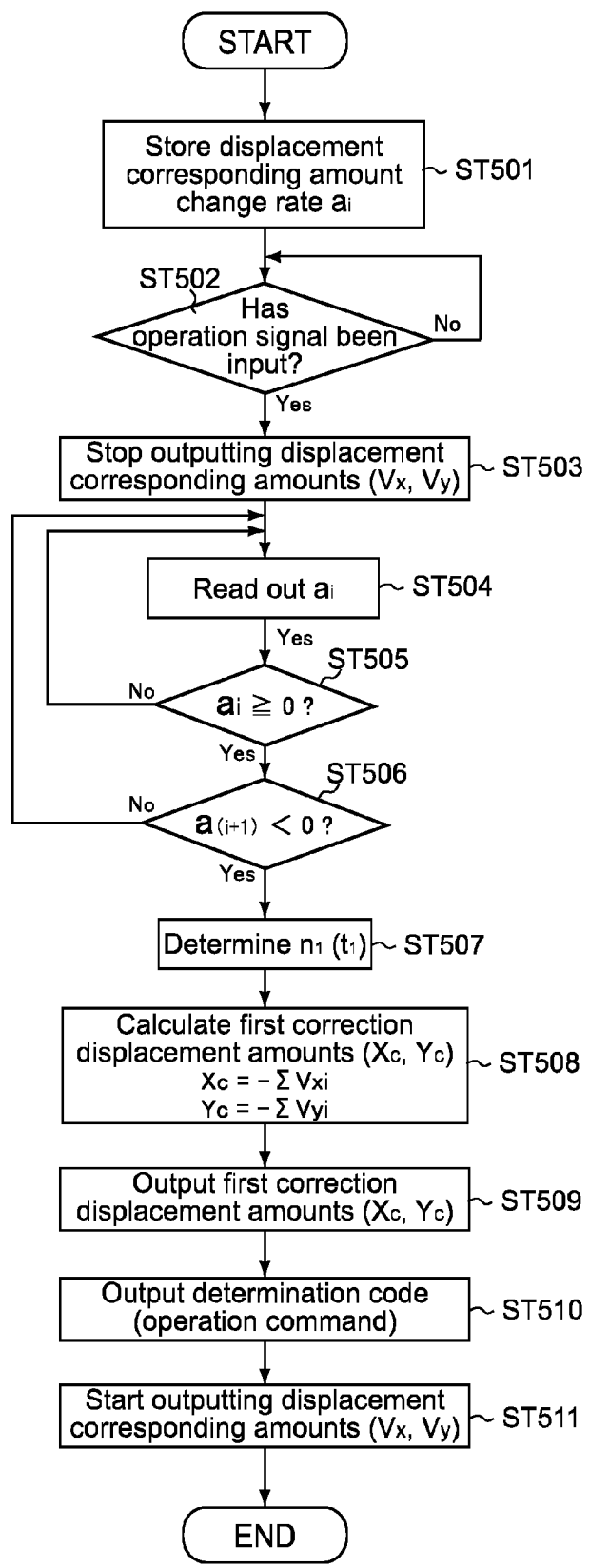
FIG. 17 A flowchart showing an operation of the input apparatus according to still another embodiment.

Next, still another embodiment of a case where the user operates the operation section 23 will be described. FIG. 17 is a flowchart showing an operation of the input apparatus 1 of this embodiment. It should be noted that in this embodiment, points different from those of the operation shown in FIG. 16 will mainly be described.

Figure 18:
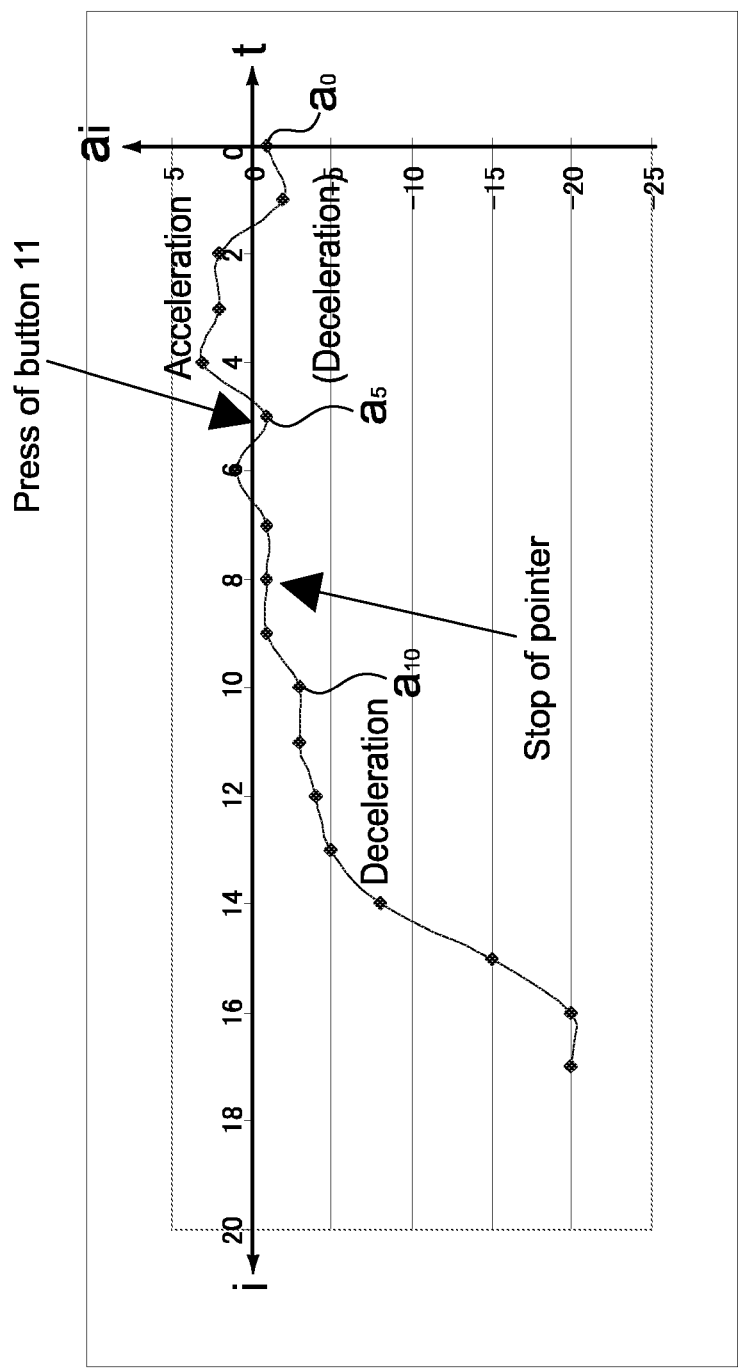
FIG. 18 A diagram showing a change rate $a_i$ of a displacement corresponding amount stored in the input apparatus in a case where the pointer takes the movement shown in FIG. 11(A).

FIG. 18 is a diagram showing a change rate (acceleration) $a_i$ of a displacement corresponding amount stored in the input apparatus in a case where the pointer 2 takes the movement shown in FIG. 11(A). In this embodiment, a difference between vector amounts of displacement corresponding amounts is stored as the change rate of the displacement corresponding amount. Therefore, positive values on an ordinate axis of FIG. 18 represent accelerations, and negative values represent decelerations. It should be noted that in FIG. 18, a change rate of a displacement corresponding amount at the time the input of the operation signal is started is represented by $a_0$, and a change rate of a displacement corresponding amount stored i cycles before the input of the operation signal is represented by $a_i$.

As shown in FIG. 18, when the pointer 2 is operated as shown in FIG. 11 on the screen 3, the change rate $a_i$ of the displacement corresponding amount approaches 0 while taking a negative value when the user brings the pointer 2 closer to the icon 4. Next, by the user placing the pointer on the icon 4, the change rate of the displacement corresponding amount takes a positive or negative value close to 0. After that, by the user starting to press the button 11 and the casing 10 being moved by an operation caused by that press (see FIGS. 13(A) and 13(B)), the change rate of the displacement corresponding amount increases from the value close to 0 to a positive value. Then, the switch is turned on and an operation signal from the switch is input to the MPU 19.

It can be seen from FIG. 18 that the change rate of the displacement corresponding amount changes from the negative value to the positive value when the press of the button 11 is started. In this embodiment, this relationship is used to determine the first time period.

As shown in FIG. 17, the MPU 19 stores the change rate of the displacement corresponding amount (Step 501) (see FIG. 18). For example, change rates of displacement corresponding amounts obtained by Equations (8) and (9) below are stored. In other words, the MPU 19 stores a difference between vector amounts of displacement corresponding amounts as the change rate of the displacement corresponding amount.

$$V_i = (V_{xi}^2 + V_{yi}^2)^{1/2} \quad (8)$$

$$a_i = V_i - V_{(i+1)} \quad (9)$$

When the switch is turned on, the switch starts generating an operation signal and starts outputting it to the MPU 19. Upon being input with the operation signal (YES in Step 502), the MPU 19 stops outputting displacement corresponding amounts (Step 503). Further, upon being input with the operation signal, the MPU 19 reads out a change rate $a_i$ of a displacement corresponding amount stored in the memory (Step 504) and judges whether the change rate $a_i$ of the displacement corresponding amount is equal to or larger than 0 (Step 505).

In this case, a change rate $a_0$ of a displacement corresponding amount obtained at a time the input of the operation signal is started is first read out (Step 504), and a judgment is made on whether the change rate $a_0$ of the displacement corresponding amount obtained at the time the input of the operation signal is started is equal to or larger than 0 (Step 505). When the change rate $a_0$ of the displacement corresponding amount is smaller than 0 (NO in Step 505), the MPU 19 reads out a change rate $a_1$ of a displacement corresponding amount stored in the memory one cycle before the input of the operation signal (Step 504) and judges whether the change rate $a_1$ of the displacement corresponding amount is equal to or larger than 0 (Step 505). As described above, when the change rate of the displacement corresponding amount is smaller than 0, the change rate $a_i$ of the displacement corresponding amount is read out backwardly from the start of the input of the operation signal and subjected to the threshold-value judgment.

On the other hand, when the change rate $a_i$ of the displacement corresponding amount is equal to or larger than 0 (YES in Step 505), the MPU 19 reads out a change rate $a_{(i+1)}$ of a displacement corresponding amount stored in the memory one cycle before the change rate $a_i$ of the displacement corresponding amount that is equal to or larger than 0. Then, a judgment is made on whether the change rate $a_{(i+1)}$ of the displacement corresponding amount $a_{(i+1)}$ that has been read out is smaller than 0 (Step 506).

When the change rate $a_{(i+1)}$ of the displacement corresponding amount is equal to or larger than 0 (NO in Step 506), the process again returns to Step 504.

On the other hand, when the change rate $a_{(i+1)}$ of the displacement corresponding amount is smaller than 0 (YES in Step 506), n is determined based on the change rate $a_{(i+1)}$ of the displacement corresponding amount (Step 507).

For example, n=5 is determined since, in the example shown in FIG. 18, a change rate $a_4$ of a displacement corresponding amount stored in the memory 4 cycles before the start of the input of the operation signal is equal to or larger than 0 (YES in Step 505) and a change rate $a_5$ of a displacement corresponding amount $a_5$ stored in the memory 5 cycles before the input of the operation signal is smaller than 0 (YES in Step 506) (Step 507). It should be noted that if n is determined, the first time period $t_1$ is also determined.

Upon determining n, the MPU 19 calculates the first correction displacement amounts $(X_c, Y_c)$ based on n (Step 508) (see Equations (3) and (4)), and outputs the calculated correction displacement amounts (Step 509).

Since the first correction displacement amounts corresponding to a level of the unintentional movement of the pointer are calculated every time the input of the operation signal is started in the processing shown in FIG. 17, coordinate values of the pointer can be corrected appropriately. Furthermore, because the threshold-value judgment is carried out on vector amounts of change rates of displacement corresponding amounts in this embodiment, the coordinate values of the pointer 2 can be corrected appropriately irrespective of a direction in which the pointer 2 approaches the icon and a direction in which the pointer is moved unintentionally.

It should be noted that there may be a case where a portion where $a_i$ is equal to or larger than 0 and $a_{(i+1)}$ is smaller than 0 does not exist within a period from when the user has started to press the button 11 to when the switch is turned on. Therefore, it is also possible not to read out the displacement corresponding amount and not to determine n (first time period $t_1$) when i exceeds a maximum value N as a maximum value possible for i in Step 504. Alternatively, in this case, the first correction displacement amounts $(X_c, Y_c)$ may be calculated based on preset n (first time period $t_1$).

Further, it is also possible to cause the input apparatus 1 to execute at least two or more processing out of the processing shown in FIGS. 15, 16, and 17, and calculate the first correction displacement amounts by determining n (first time period $t_1$) when n (first time period $t_1$) takes a common value.

In the description on FIG. 17, a difference between vector amounts of displacement corresponding amounts has been stored in the memory as the change rate $a_i$ of the displacement corresponding amount. However, the embodiment is not limited thereto, and the input apparatus 1 may store an acceleration value $a_x$ in the X'-axis direction or an acceleration value $a_y$ in the Y'-axis direction that has been output from the sensor unit 17 as the change rate of the displacement corresponding amount. Accordingly, a calculation amount of the input apparatus can be reduced to thus reduce power consumption of the input apparatus.

In this case, the MPU 19 sequentially reads out the acceleration value $a_x$ in the X'-axis direction or the acceleration value $a_y$ in the Y'-axis direction that has been stored in the memory and carries out a threshold-value judgment thereon, to thus determine n (first time period $t_1$). Which of the acceleration value $a_x$ in the X'-axis direction and the acceleration value $a_y$ in the Y'-axis direction is to be used only needs to be selected as appropriate in consideration of a position of the button 11 with respect to the casing and a direction in which the pointer 2 is moved unintentionally (see FIG. 14).

Next, another embodiment of a case where the user operates the operation section 23 will be described.

In the above embodiments, the correction displacement amounts (first correction displacement amounts) have been output when the button 11 is pressed and the input of the operation signal is thus started. On the other hand, this embodiment is different from the above embodiments in that correction displacement amounts (second correction displacement amounts) are output also when the press of the button 11 is released and the input of the operation signal is thus canceled. Moreover, this embodiment is also different from the above embodiments in that the movement of the pointer 2 is restricted during a predetermined time period since the turn-on of the switch due to the start of the press of the button 11 and a predetermined time period since turn-off of the switch due to the release of the press of the button 11. Therefore, that point will mainly be described.

It should be noted that in this embodiment, a time period used for calculating the second correction displacement amounts will be described as a second time period. Moreover, a time period during which the movement of the pointer 2 is restricted since the start of the press of the button 11 and the start of the input of the operation signal will be described as a first restriction time period, and a time period during which the movement of the pointer 2 is restricted since the release of the press of the button 11 and the cancel of the input of the operation signal will be described as a second restriction time period.

Figure 19:
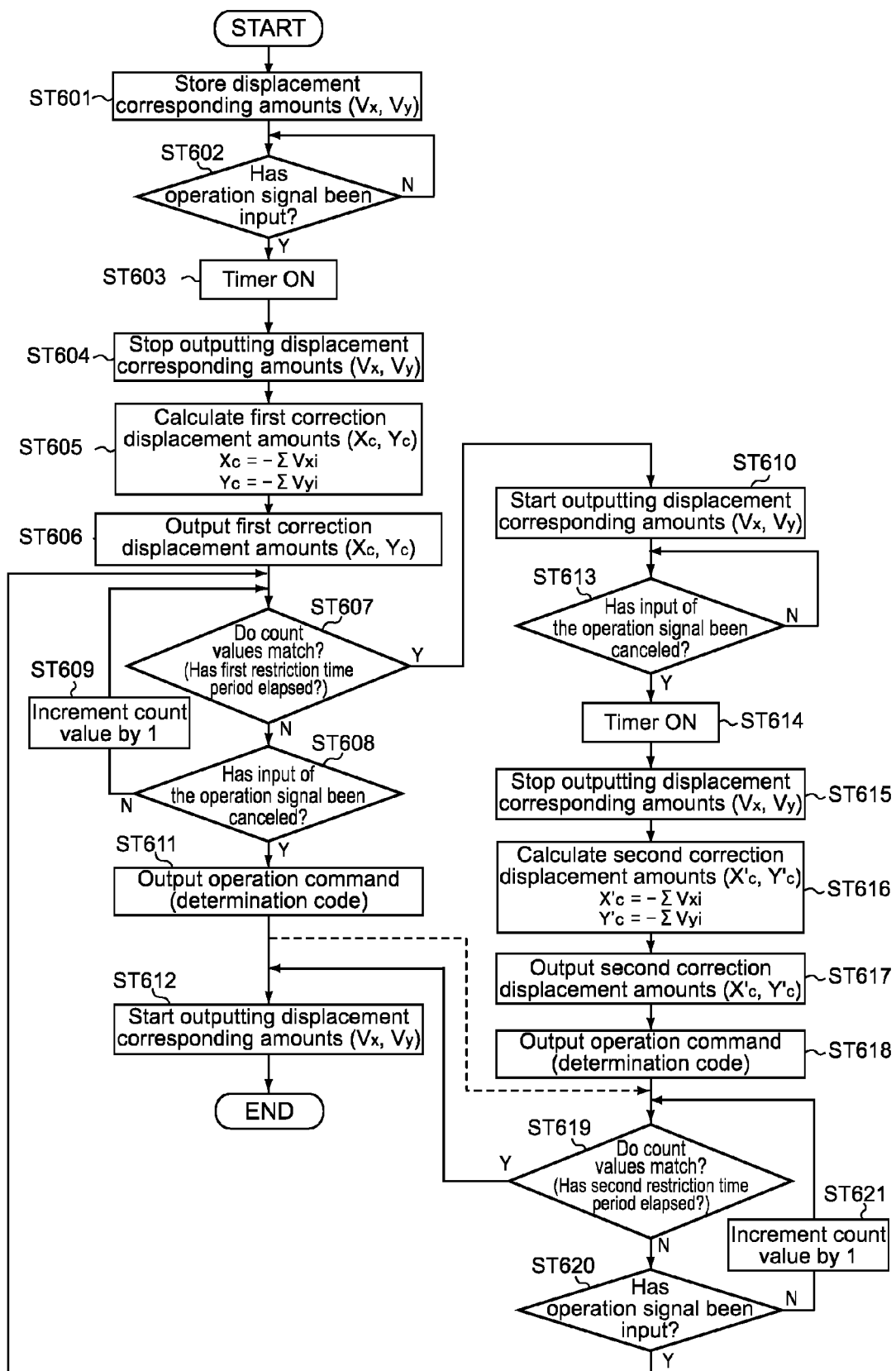
FIG. 19 A flowchart showing an operation of the input apparatus according to still another embodiment.

FIG. 19 is a flowchart showing an operation of the input apparatus 1 of this embodiment.

Figure 20:
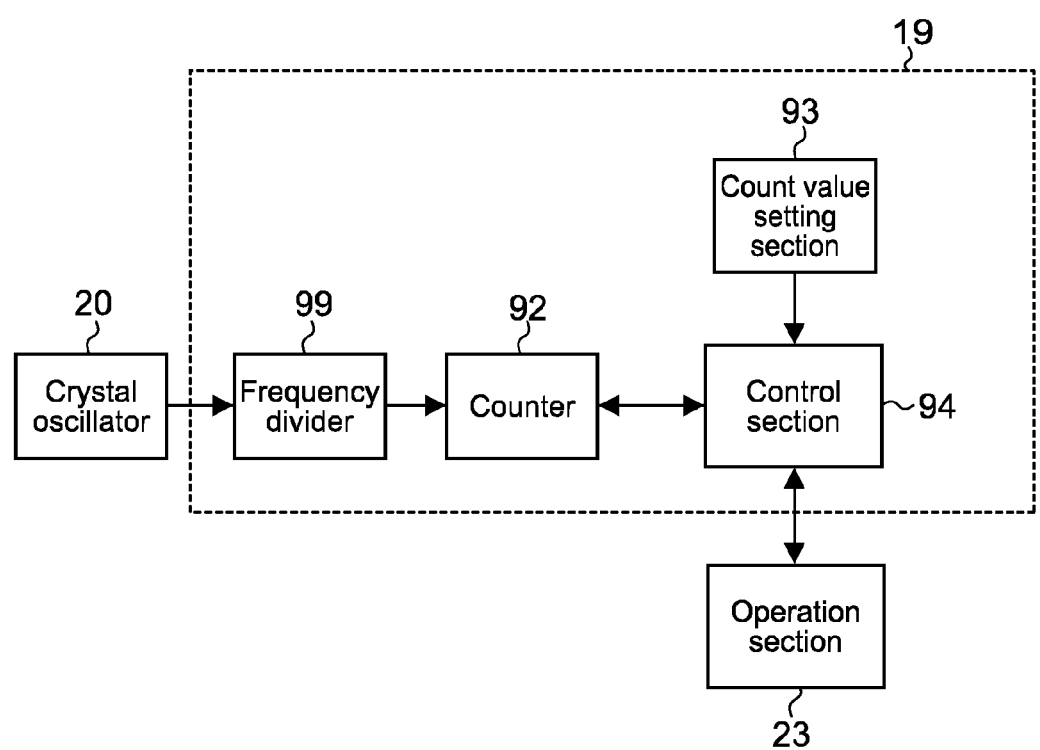
FIG. 20 A functional block diagram of the input apparatus for realizing the operation shown in FIG. 19.

FIG. 20 is a functional block diagram of the input apparatus 1 for realizing the operation shown in FIG. 19.

A frequency divider 99 generates clock pulses of a predetermined frequency based on pulses supplied from the crystal oscillator 20. A counter 92 counts the clock pulses generated by the frequency divider 99. A count value setting section 93 stores a predetermined number of count values that have been set, for example. A control section 94 compares the count value supplied from the counter 92 and the count value supplied from the count value setting section 93 to count the first restriction time period and the second restriction time period.

Blocks of the frequency divider 99, the counter 92, the count value setting section 93, the control section 94, and the like are included in the MPU 19, for example. Instead of the MPU 19, those blocks may be included in a DSP (Digital Signal Processor), an FPGA (Field Programmable Gate Array), or the like. It should be noted that in descriptions below, the blocks are assumed to be included in the MPU 19, and processing of the control section 94 will be described as processing of the MPU 19.

A first count value that corresponds to the first restriction time period and a second count value that corresponds to the second restriction time period are stored in advance in the count value setting section 93. As described above, the first restriction time period is a time period during which the movement of the pointer 2 is restricted since the press of the button 11 is started and the switch is thus turned on (see FIG. 13(B)). Further, the second restriction time period is a time period during which the movement of the pointer 2 is restricted since the press of the button 11 is released and the switch is thus turned off (see FIG. 13(D)).

The first restriction time period and the second restriction time period may either be different or the same. Typically, each of the first restriction time period and the second restriction time period is 0.2 sec, though not limited thereto. The user may be allowed to customize at least one of the first restriction time period and the second restriction time period. For realizing such customization by the user, the input apparatus 1 may be provided with, for example, a DIP switch or a variable resistor. Further, it is also possible to allow the user to customize the first restriction time period and the second restriction time period by operating the input apparatus 1 and the operation section 23 to operate a GUI on the screen 3.

By allowing the first restriction time period and/or the second restriction time period to be customized as described above, the user can arbitrarily set a time period that matches his/her own operational feeling, with the result that an operational feeling in operating the button 11 can be improved.

As shown in FIG. 19, the MPU 19 stores displacement corresponding amounts in, for example, a volatile memory (not shown) (Step 601) (see FIG. 12). When the generation of the operation signal is started by the switch and the input of the operation signal is started (YES in Step 602), the MPU 19 turns on a timer (Step 603) and stops outputting the displacement corresponding amounts (Step 604).

Upon being input with the operation signal, the MPU 19 calculates the first correction displacement amounts (Step 605) and outputs the calculated first correction displacement amounts (Step 606). Here, the first time period $t_1$ or n used for calculating the first correction displacement amounts $(X_c, Y_c)$ may be determined by the processing as shown in FIGS. 15 and 16 based on the displacement corresponding amount or by the processing as shown in FIG. 17 based on the change rate of the displacement corresponding amount. Alternatively, a value preset as a fixed value may be used for the first time period $t_1$ or n. The same holds true for the second time period $t_2$.

When the timer is turned on (Step 603), the MPU 19 compares the first count value set in the count value setting section 93 and the count value supplied from the counter 92 to judge whether the first restriction time period has elapsed since the input of the operation signal (Step 607).

When the count values do not match, that is, when the first restriction time period has not elapsed since the input of the operation signal (NO in Step 607), the MPU 19 keeps the timer operating and advances to the next Step 608. In Step 608, the MPU 19 monitors whether the pressed button 11 has been released, that is, whether the input of the operation signal has been canceled. When the pressed button 11 is not released (NO in Step 608), the MPU 19 increments the count value by 1 (Step 609) and returns to Step 607.

On the other hand, when the count values match, that is, when the first restriction time period has elapsed since the input of the operation signal without the input of the operation signal being canceled (see NO in Step 608) (YES in Step 607), the MPU 19 starts outputting the displacement corresponding amounts (Step 610).

As described above, the MPU 19 stops outputting the displacement corresponding amounts until the count value supplied from the counter 92 and the first count value match, that is, until the first restriction time period elapses since the input of the operation signal. Alternatively, the MPU 19 continues outputting a signal with the displacement corresponding amounts set to 0 $((V_x, V_y)=(0, 0))$. By such processing, the movement of the pointer 2 on the screen 3 is restricted even when the casing 10 is moved after the switch is turned on (see FIG. 13(B)) and a movement thereof is detected by the sensor unit 17 (see FIGS. 13(C) and 13(D)). Therefore, the pointer 2, the icon 4, and the like can be prevented from making any moves unintended by the user on the screen.

It should be noted that when the input of the operation signal is canceled within the first restriction time period since the input of the operation signal (see NO in Step 607) (YES in Step 608), the MPU 19 outputs a determination code (Step 611) and starts outputting the displacement corresponding amounts (Step 612). In other words, the MPU 19 starts outputting the displacement corresponding amounts when the press of the button 11 is released and the input of the operation signal is thus canceled within the first restriction time period since the input of the operation signal (e.g., when user has clicked button 11).

When the output of the displacement corresponding amounts is started in Step 610, the MPU 19 next monitors whether the pressed button 11 has been released, that is, whether the input of the operation signal has been canceled (Step 613).

Here, Step 610 is a state where the input of the operation signal is not yet canceled (see NO in Step 608) and the user is moving the input apparatus 1 while pressing the button 11. When the output of the displacement corresponding amounts from the input apparatus 1 is started in Step 610, the control apparatus 40 receives the displacement corresponding amounts. When the position of the pointer 2 on the screen is on the icon 4, the control apparatus 40 moves the pointer 2 and the icon 4 on the screen in accordance with the received displacement corresponding amounts to thus control display of a drag operation.

Specifically, when the user continues pressing the button 11 for a time period equal to or longer than the first restriction time period (press-and-hold), the output of the displacement corresponding amounts from the input apparatus 1 is started, and the drag operation is displayed on the screen.

When the switch is turned off (see FIG. 13(D)) and the input of the operation signal is thus canceled (YES in Step 613), the MPU 19 again turns on the timer (Step 614) and starts a count-up by the counter 92. Then, the MPU 19 stops outputting the displacement corresponding amounts (Step 615). Alternatively, the MPU 19 starts outputting a signal with the displacement corresponding amounts set to 0 $((V_x, V_y)=(0, 0))$.

Further, when the input of the operation signal from the switch is canceled, the MPU 19 reads out the displacement corresponding amounts stored in the memory during a period starting from a second time period before the cancel of the input of the operation signal to when the input of the operation signal is canceled. The MPU 19 integrates the read-out displacement corresponding amounts to thus calculate second correction displacement amounts ($X_c'$, $Y_c'$) (Step 616).

Typically, assuming that the displacement corresponding amounts stored in the memory i cycles before the cancel of the input of the operation signal are represented by $V_{xi}$ and $V_{yi}$, the MPU 19 adds, as expressed in Equations (10) and (11) below, values obtained by multiplying the displacement corresponding amounts from i=0 to i=n by −, to thus calculate the second correction displacement amounts ($X_c'$, $Y_c'$).

$$X_c' = \Sigma - V_{xi} \tag{10}$$

$$Y_c' = \Sigma - V_{yi} \tag{11}$$

Assuming that the cycle time period during which the displacement corresponding amounts are stored in the memory is represented by Δt, the second time period can be expressed by Equation (12) below.

$$t_2 = \Delta t * n \tag{12}$$

Upon calculating the second correction displacement amounts, the MPU 19 outputs the second correction displacement amounts (Step 617) and outputs a determination code after outputting the second correction displacement amounts (Step 618).

Upon receiving the second correction displacement amounts, the control apparatus 40 adds the second correction displacement amounts to the coordinate values obtained at the time the input of the operation signal has been canceled to calculate correction coordinate values, and controls display so that the pointer 2 and the icon 4 are displayed at the correction coordinate values.

By such processing, the unintentional movement of the pointer from when the user has started to release the press of the button 11 to when the switch is turned off (see FIGS. 13(C) and 13(D)) can be prevented. In the case of the drag operation in particular, the displacement corresponding amounts are output even while the button 11 is pressed. Therefore, a correction of the display positions of the pointer 2 and the icon 4 by the second correction displacement amounts when the press of the button 11 is released and the input of the operation signal is thus canceled becomes an effective means for preventing the unintentional movement of the pointer 2, the icon 4, and the like.

When the timer is turned on in Step 614, the MPU 19 compares the second count value set in the count value setting section 93 and the count value supplied from the counter 92 to judge whether the second restriction time period has elapsed since the cancel of the input of the operation signal (Step 619).

When the count values do not match, that is, when the second restriction time period has not elapsed since the cancel of the input of the operation signal (NO in Step 619), the MPU 19 keeps the timer operating and advances to the next Step 620. In Step 620, the MPU 19 monitors whether the released button 11 has been re-pressed, that is, whether the input of the operation signal is started again. When the button 11 is not pressed, the MPU 19 increments the count value by 1 (Step 621) and returns to Step 619.

When the operation signal is input again within the second restriction time period since the cancel of the input of the operation signal (YES in Step 620), the MPU 19 resets the timer and returns to Step 607.

When the count values match (YES in Step 619), that is, when the second restriction time period has elapsed since the cancel of the input of the operation signal, the MPU 19 ends the timer. In this case, the output of the displacement corresponding amounts is started (Step 612) and the pointer 2 moves on the screen 3. By such processing, the movement of the pointer 2 on the screen 3 is restricted even when the casing is moved after the switch is turned off and a movement thereof is detected by the sensor unit 17 (FIGS. 13(D) and 13(E)). Therefore, the pointer 2, the icon 4, and the like can be prevented from making any moves unintended by the user after the switch is turned off.

As indicated by a broken line in FIG. 19, the MPU 19 may advance to the processes of Step 619 and subsequent steps after the input of the operation signal is canceled and the determination code is output (Step 611).

By the processing shown in FIG. 19, the pointer 2 can be prevented from making any moves unintended by the user (unintentional movement) before the switch is turned on, after the switch is turned on, before the switch is turned off, and after the switch is turned off.

The processing shown in FIG. 19 may be executed by the control apparatus 40. In this case, the control apparatus 40 receives information on the displacement corresponding amounts and the operation signal transmitted from the input apparatus 1 (reception means). The MPU 35 of the control apparatus 40 stores the received displacement corresponding amounts in the built-in volatile memory of the MPU 35, for example. Upon start of the reception of the operation signal via the transceiver 38, the MPU 35 of the control apparatus 40 integrates the displacement corresponding amounts stored during a period starting from a first time period before the start of the reception to when the operation signal is received, to thus calculate the first correction displacement amounts ($X_c$, $Y_c$). Moreover, when the reception of the operation signal is canceled when a drag operation is displayed on the screen 3, the MPU 35 integrates the displacement corresponding amounts stored in the memory during a period starting from a second time period before the cancel of the reception to when the reception is canceled, to thus calculate the second correction displacement amounts ($X_c'$, $Y_c'$). The control apparatus 40 uses the calculated first and second correction displacement amounts to correct the coordinate values of the pointer 2.

Figure 21:
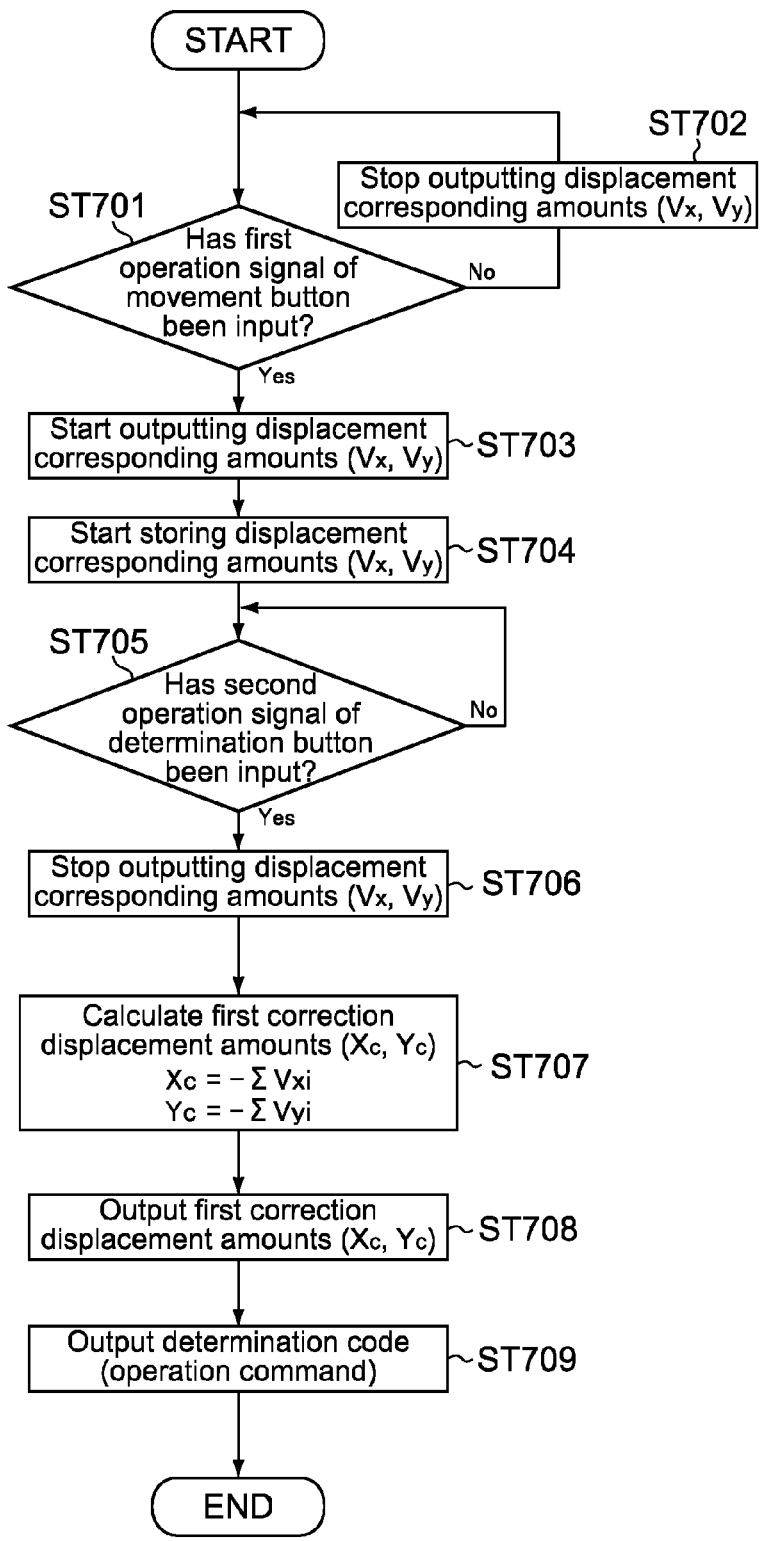
FIG. 21 A flowchart showing an operation of the input apparatus according to still another embodiment.

Next, another embodiment of a case where the user operates the operation section 23 will be described. FIG. 21 is a flowchart showing an operation of the input apparatus 1 of this embodiment. It should be noted that in this embodiment, points different from those of the operation shown in FIG. 10 will mainly be described.

FIGS. 22(A) to 22(C) are schematic diagrams showing a structure of the button 11 of the input apparatus 1 of this embodiment.

The button 11 of the input apparatus 1 of this embodiment is a button including a 2-step action. The button 11 includes, for example, a movement button 7 (first button), a determination button 8 (second button) provided physically apart from the movement button 7, and a surface button 6 capable of successively pressing the movement button 7 and the determination button 8. The movement button 7 includes a built-in switch (first switch) (not shown), and the determination button 8 also includes a built-in switch (second switch) (not shown). The switches of the movement button 7 and the determination button 8 are electrically connected to the main substrate 18. It should be noted that the movement button 7 is a button for controlling a start and stop of a movement of the pointer 2.

When the movement button 7 is pressed and the first switch is thus turned on, the first switch starts generating a first operation signal and outputs the first operation signal to the MPU 19. On the other hand, when the determination button 8 is pressed and the second switch is thus turned on, the second switch starts generating a second operation signal and outputs the second operation signal to the MPU 19.

FIG. 22(A) is a diagram showing a state where the button 11 is not pressed by the user. The surface button 6 is connected to a shaft 9 provided on the casing 10 and is connected to the casing 10 at an end portion thereof opposite to the shaft 9 via a spring 24. By the user pressing a surface of the surface button 6 by a finger 34, the surface button 6 rotates about the shaft 9 against a spring force of the spring 24. The movement button 7 and the determination button 8 are each a push-type button. The surface button 6 is provided with, on a back surface thereof, protrusions 6a and 6b capable of respectively pressing the movement button 7 and the determination button 8.

The movement button 7 and the determination button 8 are provided inside the casing 10, for example. When the surface button 6 is pressed a predetermined distance (see FIG. 22(B)), the movement button 7 is pressed by the protrusion 6a, and when the surface button 6 is subsequently pressed an additional predetermined distance (see FIG. 22(C)), the determination button 8 is pressed by the protrusion 6b. FIG. 22(B) shows a state where the movement button 7 is pressed but the determination button 8 is not pressed. FIG. 22(C) shows a state where both the movement button 7 and the determination button 8 are pressed.

When releasing the pressed surface button 6, the surface button 6 moves as shown in the stated order of FIG. 22(C), FIG. 22(B), and FIG. 22(A) by the spring force of the spring 24, and the determination button 8 is released first and the movement button 7 is released thereafter.

With the button 11 structured as described above, a so-called halfway pressing that maintains a state where the movement button 7 is pressed but the determination button 8 is not (FIG. 22(B)) is also possible. The user moves the pointer 2 to a desired position by moving the input apparatus 1 while pressing the button 11 halfway.

As shown in FIG. 21, in a state where the user is not pressing the movement button 7 of the button 11 and the first operation signal is thus not input from the first switch (NO in Step 701), the MPU 19 is not outputting the displacement corresponding amounts (Step 702). Alternatively, the MPU 19 is outputting a signal with the displacement corresponding amounts set to 0 (($V_x$, $V_y$)=(0, 0)). In other words, the pointer 2 does not move on the screen 3 even when the user moves the input apparatus 1 while holding it. Accordingly, a movement of the pointer 2 unintended by the user can be restricted.

When the movement button 7 is pressed to turn on the first switch and the first operation signal from the first switch is thus started to be input, the MPU 19 starts outputting the displacement corresponding amounts (Step 703) (output control means). Upon receiving the displacement corresponding amounts, the MPU 35 of the control apparatus 40 controls display of the pointer 2 so that the movement of the pointer 2 that corresponds to the displacement corresponding amounts is started.

Upon start of the output of the displacement corresponding amounts, the MPU 19 starts storing the displacement corresponding amounts in the built-in memory thereof, for example (Step 704).

When the determination button 8 is pressed while the movement button 7 is pressed and the second switch is thus turned on, the second switch starts generating a second operation signal and outputs the second operation signal to the MPU 19. Upon being input with the second operation signal from the second switch (YES in Step 705), the MPU 19 stops outputting the displacement corresponding amounts (Step 706). Alternatively, the MPU 19 starts outputting a signal with the displacement corresponding amounts set to 0 (($V_x$, $V_y$)=(0, 0)).

Moreover, upon being input with the second operation signal from the second switch, the MPU 19 calculates the first correction displacement amounts (Step 707) and outputs the calculated first correction displacement amounts (Step 708). Here, the first time period $t_1$ or n used for calculating the first correction displacement amounts ($X_c$, $Y_c$) may be determined by the processing as shown in FIGS. 15 and 16 based on the displacement corresponding amount or by the processing as shown in FIG. 17 based on the change rate of the displacement corresponding amount. Alternatively, a value preset as a fixed value may be used for the first time period $t_1$ or n.

Upon outputting the first correction displacement amounts, the MPU 19 outputs a determination code in accordance with the second operation signal (Step 709). The determination code may be output when the press of the determination button 8 is released and the input of the second operation signal from the second switch is thus canceled.

By the processing shown in FIG. 21, the unintentional movement of the pointer 2 from when the determination button 8 is pressed to when the second switch is turned on can be prevented.

Moreover, in this embodiment, a determination code is output when the user presses the determination button 8 so as to input a second operation signal in a state where the movement button 7 is pressed and a first operation signal is thus input. Accordingly, it becomes possible to move the pointer by pressing the movement button 7 and subsequently output the determination code by pressing the determination button 8, with the result that the user can perform operations intuitionally.

In particular, because successive operations described above can be performed by the user pressing one surface button 6 of the button 11, intuitiveness can be improved.

It should be noted that the MPU 19 may execute the processing shown in FIG. 19 after executing the processes shown in Steps 701 to 704 of FIG. 21. In this case, the operation signal referred to in Steps 602, 608, 613, and 620 of FIG. 19 is replaced with the second operation signal. Accordingly, the pointer 2 can be prevented from making any moves unintended by the user (unintentional movement) before and after the second switch of the determination button 8 is turned on and before and after the second switch is turned off.

Figure 23:
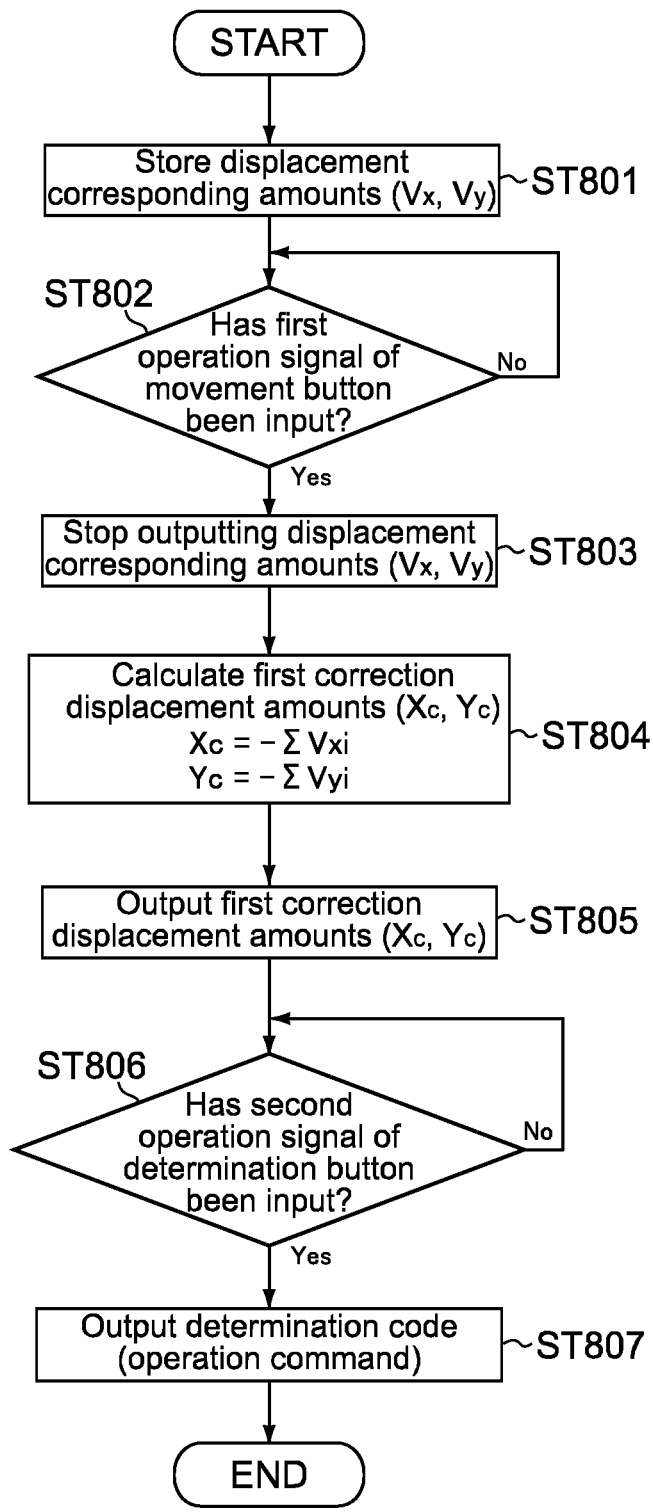
FIG. 23 A flowchart showing an operation of the input apparatus according to still another embodiment.

Next, still another embodiment of a case where the user operates the operation section 23 will be described. FIG. 23 is a flowchart showing an operation of the input apparatus 1 of this embodiment. In the above-described processing shown in FIG. 21, the case where the movement of the pointer 2 is started when the movement button 7 is pressed has been described. On the other hand, in this embodiment, the movement of the pointer 2 is stopped when the movement button 7 is pressed. Therefore, that point will mainly be described.

As shown in FIG. 23, the MPU 19 stores the displacement corresponding amounts in a built-in volatile memory, for example (Step 801).

In a state where the movement button 7 of the button 11 is not pressed by the user and the first operation signal from the first switch is thus not input (NO in Step 802), the MPU 19 is still outputting the displacement corresponding amounts. Therefore, by the user moving the casing 10, the pointer 2 moves on the screen 3.

When the movement button 7 is pressed to turn on the first switch and the first operation signal is thus input (YES in Step 802), the MPU 19 stops outputting the displacement corresponding amounts (Step 803).

Moreover, when the movement button 7 is pressed and the first operation signal is thus input, the MPU 19 calculates the first correction displacement amounts (Step 804) and outputs the first correction displacement amounts (Step 805).

When the determination button 8 is pressed while the movement button 7 is pressed and the second operation signal from the second switch is thus input (YES in Step 806), the MPU 19 outputs a determination code (Step 807). The determination code may be output when the press of the determination button 8 is released and the input of the second operation signal is thus canceled.

By the processing shown in FIG. 23, the unintentional movement of the pointer 2 before the first switch of the movement button 7 is turned on can be prevented.

Next, an input apparatus according to another embodiment will be described.

Figure 24:
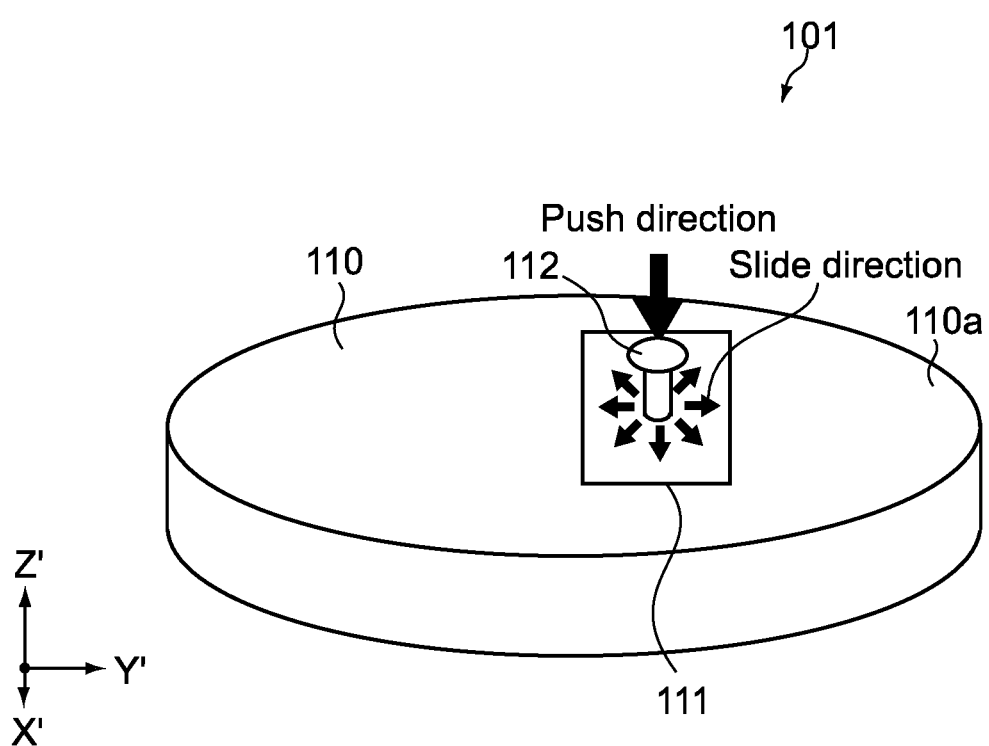
FIG. 24 A perspective diagram showing an input apparatus according to still another embodiment.

FIG. 24 is a perspective diagram showing an input apparatus of this embodiment. As shown in FIG. 24, an input apparatus 101 includes a casing 110. The casing 110 is of a size that a user is capable of holding. It should be noted that in a description on FIG. 24, a longitudinal direction of the casing 110 will be referred to as Y' direction, a width direction of the casing 110 will be referred to as X' direction, and a thickness direction will be referred to as Z' direction for convenience.

On an upper surface 110a of the casing 110, an opening 111 and an operation section 112 slidable in X'-Y' directions inside the opening 111 are provided.

A resistivity substrate (not shown) is provided inside the casing 110, for example, to detect a resistance value that corresponds to a movement of the operation section 112 inside the opening 111. A signal of the resistance value is output to the MPU 19, and a displacement corresponding amount corresponding to the resistance value is output from the input apparatus 101. It should be noted that although the resistivity substrate functions as a position detection means for detecting a position of the operation section 112 inside the opening 111, the position detection means is not limited to the resistivity substrate and may be a different component.

Further, a switch (not shown) is provided inside the casing 110. When the user presses the operation section 112 in the Z' direction, an operation signal is output to the MPU 19.

The user holds the input apparatus 101 in hand, operates the operation section 112 with, for example, a thumb, and slides the operation section 112 inside the opening 111 in the X'-Y' directions. Consequently, displacement corresponding amounts are output from the input apparatus 101, and the pointer 2 thus moves in X-Y directions on the screen 3. The user uses the input apparatus 101 to place the pointer 2 on an arbitrary icon 4 and presses the operation section 112 in, for example, the Z' direction. When the user presses the operation section 112, processing corresponding to the icon 4 is executed on the screen 3.

Also in the input apparatus 101 of this embodiment, processing the same as those described in the above embodiments can be executed. For example, referring to the example shown in FIG. 10, the MPU 19 of the input apparatus 101 stores displacement corresponding amounts, calculates first correction displacement amounts based on the stored displacement corresponding amounts, and outputs them. Accordingly, the unintentional movement of the pointer from when the press of the operation section 112 is started to when the switch is turned on can be prevented.

In the case of this embodiment, the user often moves the operation section 112 unintentionally in the X'-Y' directions when pressing the operation section 112 in the Z' direction. As a result, the pointer 2 often makes a move unintended by the user before the switch is turned on. Therefore, an effect of correcting the coordinate values of the pointer 2 on the screen 3 using the first correction displacement amounts is particularly large.

The control system described heretofore is not limited to the above embodiments and various modifications can be made.

The above embodiments have described the case where the button 11 is operated out of the operation section 23. However, the embodiments are not limited thereto, and the processing shown in the above embodiments may be executed when the button 12, the wheel button 13, other operation buttons 29, or the like is operated.

Figure 22:
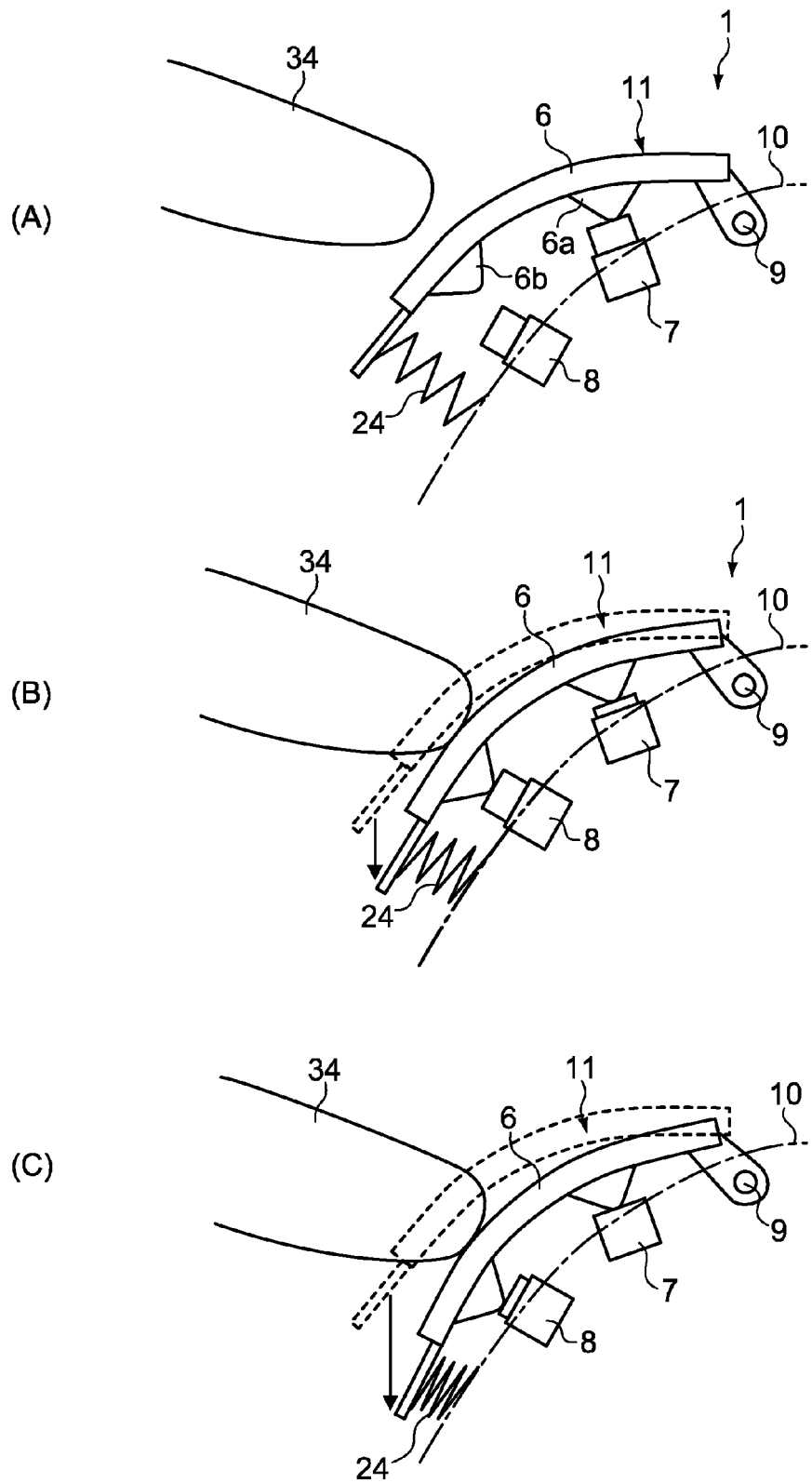
FIG. 22 Schematic diagrams showing a structure of buttons of the input apparatus according to the embodiment shown in FIG. 21.

In the description on FIG. 22, an example where an operation section including a first button 7, a second button 8, and a surface button 6 is provided as the 2-step-operation-type operation section has been described. However, the 2-step operation section is not limited thereto. The 2-step operation section may take any form as long as it is capable of performing a 2-step switch.

In the above embodiments, descriptions have been given assuming that the operation signal is input when the button 11 is pressed. However, a structure in which the input of the operation signal is canceled when the button 11 is pressed is also conceivable.

The above embodiments have been described assuming that the input apparatus 1 is operated 3-dimensionally, but it is also possible to operate the input apparatus while a part of the casing 10 is in contact with a table.

In the above embodiments, input information has been transmitted to the control apparatus wirelessly. However, the input information may be transmitted by wire.

The embodiments may be applied to, for example, a handheld-type information processing apparatus (handheld apparatus) including a display section. In this case, by the user moving a main body of the handheld apparatus, a pointer displayed on the display section is moved. Examples of the handheld apparatus include a PDA (Personal Digital Assistance), a cellular phone, a portable music player, and a digital camera.

In the above embodiments, the pointer 2 that moves on the screen 3 in accordance with the movement of the input apparatus 1 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

In the above embodiments, the input apparatus 1 has been structured to detect acceleration values in two directions and angular velocity values about two axes. However, the present invention is not limited thereto, and a structure that detects an acceleration value in a single direction and an angular velocity value about a single axis or a structure that detects acceleration values in three directions and angular velocity values about three axes may be employed instead.

Instead of the angular velocity sensor unit 15 for detecting angular velocity values, an angle sensor such as a magnetic sensor may be used. It is also possible to structure at least one of the acceleration sensor unit 16 and the angular velocity sensor unit 15 by an image sensor such as a CCD sensor or a CMOS sensor.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus moving an image displayed on a screen, comprising:
a casing;
an operation section provided to the casing;
a detection means for detecting a movement of the casing;
a storage means for storing a displacement corresponding amount that corresponds to a displacement amount of the image on the screen, the displacement amount corresponding to the movement of the casing;
a generation means for generating an operation signal based on an operation made to the operation section;
a calculation means for calculating a first correction displacement amount for correcting coordinate values of the image on the screen based on the displacement corresponding amount stored by the storage means during a first time period, the first time period corresponding to a time delay between a calculated initiation of an event to start the operation signal and a later point in time when the generation of the operation signal has actually started; and
an output means for outputting the displacement corresponding amount and the first correction displacement amount.

2. The input apparatus according to claim 1, further comprising
a determination means for determining the first time period every time the generation of the operation signal is started.

3. The input apparatus according to claim 2, further comprising
a judgment means for judging backwardly from the start of the generation of the operation signal whether an absolute value of the displacement corresponding amount stored by the storage means falls below a threshold value,
wherein the determination means determines the first time period with a time when, going back from the start of the generation of the operation signal, the displacement corresponding amount that is the first to fall below the threshold value is stored by the storage means as a reference.

4. The input apparatus according to claim 2,
wherein the storage means stores a change rate of the displacement corresponding amount,
the input apparatus further comprising
a judgment means for judging backwardly from the start of the generation of the operation signal whether the change rate of the displacement corresponding amount stored by the storage means is a positive value or a negative value,
wherein the determination means determines the first time period with a time when, going back from the start of the generation of the operation signal, the change rate of the displacement corresponding amount that is the first to shift from the positive value to the negative value, is stored by the storage means as a reference.

5. The input apparatus according to claim 1,
wherein the calculation means calculates a second correction displacement amount for correcting the coordinate values of the image on the screen based on the displacement corresponding amount stored by the storage means during a period starting from a point that is a second time period before a stop of the generation of the operation signal to when the generation of the operation signal is stopped, and
wherein the output means outputs the second correction displacement amount.

6. The input apparatus according to claim 5,
wherein the output means outputs an operation command corresponding to the operation signal,
the input apparatus further comprising
an output control means for controlling the output means to output the second correction displacement amount when the generation of the operation signal is stopped and output the operation command after the second correction displacement amount is output.

7. The input apparatus according to claim 1, further comprising
a variable means for varying the first time period.

8. The input apparatus according to claim 1, further comprising
an output control means for controlling the output means to stop outputting the displacement corresponding amount or output the displacement corresponding amount set to 0 during a predetermined time period since the start of the generation of the operation signal.

9. The input apparatus according to claim 1, further comprising
an output control means for controlling the output means to stop outputting the displacement corresponding amount or output the displacement corresponding amount set to 0 during a predetermined time period since a stop of the generation of the operation signal.

10. The input apparatus according to claim 1,
wherein the output means outputs an operation command corresponding to the operation signal,
the input apparatus further comprising
an output control means for controlling the output means to output the first correction displacement amount when the generation of the operation signal is started and output the operation command after the first correction displacement amount is output.

11. The input apparatus according to claim 10,
wherein the output control means controls the output means to output the operation command after the generation of the operation signal is stopped after the first correction displacement amount is output.

12. The input apparatus according to claim 1,
wherein the operation section is a two-step-operation-type operation section with which a two-step switch is possible,
wherein the generation means includes a first switch that generates a first operation signal based on an operation made to the two-step-operation-type operation section and a second switch that generates a second operation signal based on an operation made to the two-step-operation-type operation section, and
wherein the output means outputs an operation command corresponding to the second operation signal.

13. The input apparatus according to claim 12, further comprising
an output control means for controlling, when the generation of the first operation signal is started by the first switch, the output of the displacement corresponding amount by the output means so that the image starts moving,
wherein the calculation means calculates the first correction displacement amount for correcting the coordinate values of the image on the screen based on the displacement corresponding amount stored by the storage means during a period starting from a point that is the first time period before a start of the generation of the second operation signal by the second switch to when the generation of the second operation signal is started.

14. The input apparatus according to claim 12, further comprising
an output control means for controlling, when the generation of the first operation signal is started by the first switch, the output of the displacement corresponding amount by the output means so that the image stops moving,
wherein the calculation means calculates the first correction displacement amount for correcting the coordinate values of the image on the screen based on the displacement corresponding amount stored by the storage means during a period starting from a point that is the first time period before the start of the generation of the first operation signal by the first switch to when the generation of the first operation signal is started.

15. A control apparatus for controlling display of a movement of an image on a screen based on a signal corresponding to a movement of a casing and an operation signal output from an input apparatus including the casing, a detection means for detecting the movement of the casing, an operation section provided to the casing, and a generation means for generating the operation signal based on an operation made to the operation section, the control apparatus comprising:
a reception means for receiving the signal corresponding to the movement of the casing and the operation signal;
a storage means for storing a displacement corresponding amount that corresponds to a displacement amount of the image on the screen, the displacement amount corresponding to the movement of the casing;
a calculation means for calculating a first correction displacement amount for correcting coordinate values of the image on the screen based on the displacement corresponding amount stored by the storage means during a first time period, the first time period corresponding to a time delay between a calculated initiation of an event to start the operation signal and a later point in time when the generation of the operation signal has actually started; and
a display control means for controlling the display on the screen so that the image is moved based on the displacement corresponding amount and the first correction displacement amount.

16. A control system for controlling a movement of an image displayed on a screen, the control system comprising:
an input apparatus including
a casing,
a detection means for detecting a movement of the casing,
an operation section provided to the casing,
a storage means for storing a displacement corresponding amount that corresponds to a displacement amount of the image on the screen, the displacement amount corresponding to the movement of the casing,
a generation means for generating an operation signal based on an operation made to the operation section,
a calculation means for calculating a first correction displacement amount for correcting coordinate values of the image on the screen based on the displacement corresponding amount stored by the storage means during a first time period, the first time period corresponding to a time delay between a calculated initiation of an event to start the operation signal and a later point in time when the generation of the operation signal has actually started, and
an output means for outputting the displacement corresponding amount and the first correction displacement amount; and
a control apparatus including
a reception means for receiving the displacement corresponding amount and the first correction displacement amount, and
a display control means for controlling display on the screen so that the image is moved based on the displacement corresponding amount and the first correction displacement amount.

17. A handheld apparatus for controlling a movement of an image displayed on a screen, the handheld apparatus comprising:
a casing;
a display section that is provided to the casing and displays the screen;
a detection means for detecting a movement of the casing;
a storage means for storing a displacement corresponding amount that corresponds to a displacement amount of the image on the screen, the displacement amount corresponding to the movement of the casing;
an operation section provided to the casing;
a generation means for generating an operation signal based on an operation made to the operation section;
a calculation means for calculating a first correction displacement amount for correcting coordinate values of the image on the screen based on the displacement corresponding amount stored by the storage means during a first time period, the first time period corresponding to a time delay between a calculated initiation of an event to start the operation signal and a later point in time when the generation of the operation signal has actually started; and
a display control means for controlling display on the screen so that the image is moved based on the displacement corresponding amount and the first correction displacement amount.

18. A control method comprising:
detecting a movement of a casing;
generating an operation signal based on an input operation;

storing a displacement corresponding amount that corresponds to a displacement amount of an image on a screen, the displacement amount corresponding to the movement of the casing;

calculating a first correction displacement amount for correcting coordinate values of the image on the screen based on the displacement corresponding amount stored by the storage means during a first time period, the first time period corresponding to a time delay between a calculated initiation of an event to start the operation signal and a later point in time when the generation of the operation signal has actually started; and controlling display on the screen so that the image is moved based on the displacement corresponding amount and the first correction displacement amount.

* * * * *